United States Patent
Suh et al.

(10) Patent No.: US 7,987,409 B2
(45) Date of Patent: Jul. 26, 2011

(54) AUTOMATIC REQUEST APPARATUS AND METHOD FOR MULTIHOP SYSTEM IN BROADBAND WIRELESS ACCESS COMMUNICATION NETWORK

(75) Inventors: Kyung-Joo Suh, Seoul (KR); Ki-Young Han, Yongin-si (KR); Soon-Young Yoon, Seoul (KR); Jae-Hee Cho, Seoul (KR); Young-Hoon Kwon, Seongnam-si (KR); Dong-Ho Cho, Seoul (KR); Ki-Ho Lee, Deajeon (KR); Soo-Yong Jeon, Deajeon (KR); Jong-Wuk Son, Gyeonbuk (KR); Chi-Sung Bae, Andong-si (KR)

(73) Assignee: Samsung Electronics Co., Ltd. (KR)

( * ) Notice: Subject to any disclaimer, the term of this patent is extended or adjusted under 35 U.S.C. 154(b) by 1295 days.

(21) Appl. No.: 11/593,395

(22) Filed: Nov. 6, 2006

(65) Prior Publication Data

US 2007/0124642 A1 May 31, 2007

(30) Foreign Application Priority Data

Nov. 4, 2005 (KR) .................. 10-2005-0105521

(51) Int. Cl.
*H03M 13/00* (2006.01)
(52) U.S. Cl. .................. 714/774; 714/750; 714/749
(58) Field of Classification Search .................. 714/774, 714/750, 749
See application file for complete search history.

(56) References Cited

U.S. PATENT DOCUMENTS

| | | | |
|---|---|---|---|
| 5,699,367 A * | 12/1997 | Haartsen | 714/749 |
| 6,366,609 B1 * | 4/2002 | Rossi | 375/222 |
| 7,391,789 B2 * | 6/2008 | Kang et al. | 370/445 |
| 7,464,166 B2 * | 12/2008 | Larsson et al. | 709/228 |
| 7,545,765 B2 * | 6/2009 | Larsson et al. | 370/328 |
| 7,590,064 B1 * | 9/2009 | Zhang et al. | 370/235 |
| 2002/0051425 A1 * | 5/2002 | Larsson | 370/252 |
| 2004/0205105 A1 * | 10/2004 | Larsson et al. | 709/200 |
| 2004/0233918 A1 * | 11/2004 | Larsson et al. | 370/400 |
| 2005/0058151 A1 * | 3/2005 | Yeh | 370/445 |
| 2006/0039330 A1 * | 2/2006 | Hackett et al. | 370/335 |
| 2006/0282739 A1 * | 12/2006 | Meyer et al. | 714/748 |
| 2007/0093261 A1 * | 4/2007 | Hou et al. | 455/506 |

FOREIGN PATENT DOCUMENTS

| | | |
|---|---|---|
| JP | 2003-304273 | 10/2003 |
| KR | 1020020044566 | 6/2002 |
| WO | WO 2005/008947 | 1/2005 |

* cited by examiner

*Primary Examiner* — M. Mujtaba K Chaudry
(74) *Attorney, Agent, or Firm* — The Farrell Law FIrm, P.C.

(57) ABSTRACT

Provided are an ARQ apparatus and method for a multihop system in a broadband wireless access communication system. The ARQ method of a relay includes determining if the relay successfully receives specific data from a source and transmitting the specific data to a destination; receiving feedback data from the destination and determining if the destination successfully receives the specific data; generating feedback data including data indicating if the relay and the destination successfully receive the specific data, and outputting the feedback data to the source; and retransmitting the specific data, when the relay successfully receives the specific data but the destination fails to receive the specific data. Accordingly, when the MH-BTS successfully receives the data from the source but the destination fails to receive the data, the source does not retransmit same data to the MH-BTS.

18 Claims, 21 Drawing Sheets a) TX SUCCESS OF N-HOP DATA b) TX SUCCESS OF (N−1)-HOP DATA
(TX FAIL OF LAST HOP)

c) TX SUCCESS OF (N−2)-HOP DATA
(TX FAIL OF LAST 2 HOPS)

d) TX SUCCESS OF (N−k)-HOP DATA
(TX FAIL OF LAST k HOPS)

e) TX SUCCESS OF 0-HOP DATA
(TX FAIL OF ALL HOPS)

AUTOMATIC REQUEST APPARATUS AND METHOD FOR MULTIHOP SYSTEM IN BROADBAND WIRELESS ACCESS COMMUNICATION NETWORK

PRIORITY

This application claims priority under 35 U.S.C. §119 to an application filed in the Korean Intellectual Property Office on Nov. 4, 2005 and allocated Serial No. 2005-105521, the contents of which are incorporated herein by reference.

BACKGROUND OF THE INVENTION

1. Field of the Invention

The present invention relates generally to an automatic request apparatus and method for a multihop system in a broadband wireless access communication network.

2. Description of the Related Art

With the increase of services requiring a higher data rate, there is a demand for a communication system that can provide a higher data rate than a Third Generation (3G) mobile communication using Code Division Multiple Access (CDMA).

Multihop technology that utilizes a relay is essential to the implementation of a system having a higher data rate and to provide a service over a wider area. According to multihop technology, a relay is located between a base transceiver station (BTS) and a mobile station (MS). This relay will also be referred to as an MH-BTS (multihop-BTS).

When data is transmitted from the BTS to the MS, automatic request (ARQ) technology is used for reliable data transmission.

According to the multihop technology, instead of directly transmitting data from the BTS to the MS, the MH-BTS located between the BTS and the MS receives data from the BTS and transmits the received data to the MS. Because of the addition of the new node, i.e., the MH-BTS, the multihop technology requires a new ARQ scheme. Thus, a new ARQ mechanism and message scheme must be defined.

When the conventional ARQ technology is used in the multihop system, an ARQ state between the BTS and the MH-BTS and an ARQ state between the MH-BTS and the MS must be considered.

When the MS is a destination in the data transmission process, the successful receipt of an ARQ block by the MS can be known from an ARQ feedback message transmitted from the MS to the BTS.

The ARQ block is a block indicating if any data errors occur. The ARQ feedback message is a message used in the Institute of Electrical and Electronics Engineers (IEEE) 802.16 standards and is usually transmitted together with a generic medium access control (MAC) header.

Table 1 below shows an ARQ feedback message format.

TABLE 1

| Syntax | Size |
|---|---|
| ARQ_Feedback_Message_Format( ){ | |
|    Management Message Type = 33 | 8 bits |
|    ARQ_Feedback_Payload | variable |
| } | |

In Table 1, "Management Message Type=33" represents that the message is the ARQ feedback message. The ARQ feedback payload format is defined as Table 2 below.

TABLE 2

| Syntax | Size | Notes |
|---|---|---|
| ARQ_Feedback_Payload_Format( ){ | | |
|   Do | | |
|     ARQ_Feedback_IE(LAST) | variable | Insert as many as desired, until LAST==TRUE |
|   until (last) | | |
| } | | |

The ARQ feedback payload format includes a plurality of ARQ feedback information element (IE) formats. The ARQ feedback IE format is defined as Table 3 below.

TABLE 3

| Syntax | Size | Notes |
|---|---|---|
| ARQ_feedback_IE(LAST){ | variable | |
|   CID | 16 bits | The ID of the connection being referenced |
|   LAST | 1 bit | 0=More ARQ Feedback IE in list<br>1=Last ARQ Feedback IE in list |
|   ACK Type | 2 bits | 0x0=Selective ARQ entry<br>0x1=Cumulative ACK entry<br>0x2=Cumulative with Selective entry<br>0x3=Cumulative ACK with block Sequence ACK entry |
|   BSN | 11 bits | |
|   Number of ACK MAPs | 2 bits | If ACK Type==01, the field is reserved and set to 00. Otherwise the field indicates the number of ACK MAPs; 0x0=1, 0x1=2, 0x2=3, 0x3=4 |
|   If (ACK Type!=01) { | | |
|     For(i=0;i<Number of ACK MAPs+1;++1) { | | |
|       If(ACK Type!=3) { | | |
|         Selective ACK MAP | 16 bits | |
|       } | | |
|       Else { | | Start of Block Sequence ACK MAP definition (16 bits) |
|         Sequence Format | 1 bit | Number of Block sequences associated with descriptor<br>0: 2 Block sequence<br>1: 3 Block sequence |
|         If(Sequence Format=0) { | | |
|           Sequence ACK MAP | 2 bits | |
|     Sequence 1 length | 6 bits | |
|           Sequence 2 length | 6 bits | |
|           Reserved | 1 bit | |
|         } | | |
|         Else { | | |
|   Sequence ACK MAP | 3 bits | |
|   Sequence 1 Length | 4 bits | |
|   Sequence 2 Length | 4 bits | |
|           Sequence 3 length | 4 bits | |
|         } | | |
|       } | | End of Block Sequence ACK MAP definition |
|     } | | |
|   } | | |
| } | | |

Whether the MS successfully receives the ARQ block is represented in a plurality of 16-bit selective ACK MAP, and the respective bits indicate TX/RX success/fail of the blocks.

If the MH-BTS does not transparently relay the ARQ feedback information between the BS and the MS, the management of the data received from the BTS and the ARQ received from the MS becomes complicated and the data to be transmitted to the MS is continuously accumulated in a buffer of the MH-BTS, resulting in ineffective data transmission/reception.

FIG. 1 illustrates the transition of ARQ operation states in a source according to the related art.

In the case of a reverse link, the MS and the BTS are the source and the destination, respectively. In the case of a forward link, the BTS and the MS are the source and the destination, respectively.

Referring to FIG. 1, the source transmits an ARQ block in a general state (a "not send" state) 105 and changes to an outstanding 110. When the source receives an ACK message, the source changes the outstanding 110 to a done state 120.

When the source does not receive an ACK message or receives a NACK message during ARQ_RETRY_TIMEOUT in the outstanding state, the source changes to a "waiting for retransmission" state 115. ARQ_RETRY_TIMEOUT indicates a limit time in retransmitting the ARQ block.

When the source receives the ACK message in the "waiting for retransmission" state 115, the source changes to the done state 120. When the source does not receive the ACK message, the source retransmits the corresponding block and changes to the outstanding state 110.

When the source does not receive the ACK message during ARQ_BLOK_LIFETIME in the outstanding state 110 or the "waiting for retransmission" state 115, the source discards the corresponding block in state 125. ARQ_BLOCK_LIFETIME indicates the lifetime of the ARQ block.

FIG. 2 is a flowchart illustrating a conventional ARQ receiving process of a destination.

Referring to FIG. 2, when the destination receives the ARQ block in step 205, the process proceeds to step 210 to determine if a block sequence number (BSN) of the received ARQ block is within an ARQ_RX_WINDOW.

The ARQ_RX_WINDOW indicates a window range of the received ARQ block. The BSN indicates a sequence of the received ARQ block.

When the BSN of the received ARQ block is determined to be out of the ARQ_RX_WINDOW in step 210, the destination discards the received ARQ block in step 215.

When the BSN of the received ARQ block is within the ARQ_RX_WINDOW in step 210, the BSB of the received ARQ block is added to a list of BSNs in step 220.

When the received ARQ block is duplicated in step 225, the destination discards the received ARQ block in step 215 and ends the process.

When the received ARQ block is not duplicated in step 225, the destination determines in step 230 if the BSN of the received ARQ block is greater than or equal to the ARQ_RX_HIGHEST_BSN. The ARQ_RX_HIGHEST_BSN indicates the BSN that is received prior to the BSN of the received block.

When the BSN of the received ARQ block is greater than or equal to the ARQ_RX_HIGHEST_BSN in step 230, the ARQ_RX_HIGHEST_BSN is updated with a value of [(the greatest number of the BSNs of the received ARQ block)+1] in step 235.

In step 240, the destination determines if the BSN of the received ARQ block is equal to ARQ_RX_WINDOW_START. The ARQ_RX_WINDOW_START indicates a BSN where a window of the received ARQ block starts.

When the BSN of the received ARQ block is equal to the ARQ_RX_WINDOW_START in step 240, the ARQ_RX_WINDOW_START is updated with a smallest BSN of ARQ blocks that are not yet received in step 250 and the received ARQ block is stored in step 225.

The destination RX state with respect to the ARQ block is transmitted through the ARQ feedback message.

FIG. 3 illustrates a conventional transmission environment of an ARQ feedback information element (IE).

Referring to FIG. 3, a service data unit (SDU) #1 305 and an SDU #2 310 are fragmented into three protocol data units (PDUs) 315, 320 and 325.

The SDUs 305 and 310 and the PDUs 315, 320 and 325 are all used in a datalink layer, and the SDUs 305 and 310 are located at a higher layer than the PDUs 315, 320 and 325. "#" indicates a sequence number.

When the destination successfully receives the PDU#1 315 and the PDU#3 325 but fails to receive the PDU#2 320, it configures a selective ACK MAP as illustrated in FIG. 4.

FIG. 4 illustrates an example of the conventional ACK MAP.

Referring to FIG. 4, each bit in the selective MAP indicates success/fail of each block. "1" and "0" indicate a success and a fail, respectively. The first 10 bits 410 indicate the success/fail of 10 blocks.

The first 3 bits set to "1" indicate that the blocks with BSNs of 5-7 are successfully received, the next 4 bits set to "0" indicate that the blocks with BSNs of 8-11 are not successfully received, the next 3 bits set to "0" indicate that the blocks with BSNs of 12-14 are successfully received.

The remaining bits 420 are set to "0".

Table 4 below shows an example of the ARQ feedback IE based on the ACK MAP.

TABLE 4

| Name | Size | Description |
|---|---|---|
| CID | ###### | Connection ID |
| LAST | 1 | Indicates the last ARQ feedback IE |
| ACK Type | 0x0 | Indicates the use of selective ACK entry |
| BSN | 5 | Indicates the smallest BSN of the blocks contained in ACK MAP |
| Number of ACK MAPs | 0x0 | A total size of ACK MAP is 32 bits |
| Selective ACK MAP | 1101 0001 1100 0000 0000 0000 0000 0000 | Contents of ACK MAP |

Upon the forward data transmission, if the MH-BTS only transmits the ARQ feedback information, the BTS retransmits the same data to the MH-BTS when the MS does not successfully receive the data, even though the MH-BTS successfully receives the data from the BTS.

Upon the reverse data transmission, the MS retransmits the same data to the MH-BTS when the BTS does not successfully receive the data, even though the MH-BTS successfully receives the data from the MS. Consequently, the ineffective data transmission/reception is caused.

SUMMARY OF THE INVENTION

An object of the present invention is to substantially solve at least the above problems and/or disadvantages and to provide at least the advantages below. Accordingly, an object of the present invention is to provide an ARQ apparatus and method for a multihop system in a broadband wireless access communication network.

According to one aspect of the present invention, an ARQ method of a relay in a broadband wireless access communication network includes determining if the relay successfully receives specific data from a source and transmitting the specific data to a destination; receiving feedback data from the destination and determining if the destination successfully receives the specific data; generating feedback data including data indicating if the relay and the destination successfully receive the specific data, and outputting the feedback data to the source; and when the relay successfully receives the specific data but the destination fails to receive the specific data, retransmitting the specific data.

According to another aspect of the present invention, an automatic request (ARQ) apparatus of a source in a broadband wireless access communication network comprises a receive data sorter for sorting received data according to transmission nodes, a relay acknowledgement (ACK) analyzer for analyzing relay feedback data from the receive data sorter and outputting data indicating whether a relay successfully receives specific data or fails to receive the specific data, a destination ACK analyzer for analyzing destination feedback data from the receive data sorter and outputting data indicating whether a destination successfully receives the specific data or fails to receive the specific data, and a transmit data adjuster for performing no retransmission when the relay successfully receives the specific data, performing retransmission when the relay fails to receive the specific data, and performing a data transmission scheduling and a processing of the data to be transmitted.

According to still another aspect of the present invention, an automatic request system in a wireless access communication network comprises a source for determining if a relay successfully receives specific data by analyzing feedback data received from the relay, determining if a destination successfully receives the specific data by analyzing feedback data received from the destination, performing no retransmission when the relay successfully receives the specific data, and performing the retransmission when the relay fails to receive the specific data, the relay for transmitting the specific data received from the source, determining if the specific data is successfully received, determining if the destination successfully receives the specific data by analyzing the feedback data received from the destination, and combining information indicating if the relay successfully receives the specific data and information indicating if the destination successfully receives the specific data and outputting the feedback data to be transmitted to the source, and the destination for receiving the data from the relay and transmitting the feedback data to the relay.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

Hereinafter, an ARQ apparatus and method for a multihop system in a broadband wireless access communication network according to the present invention will be described in detail.

Figure 5:
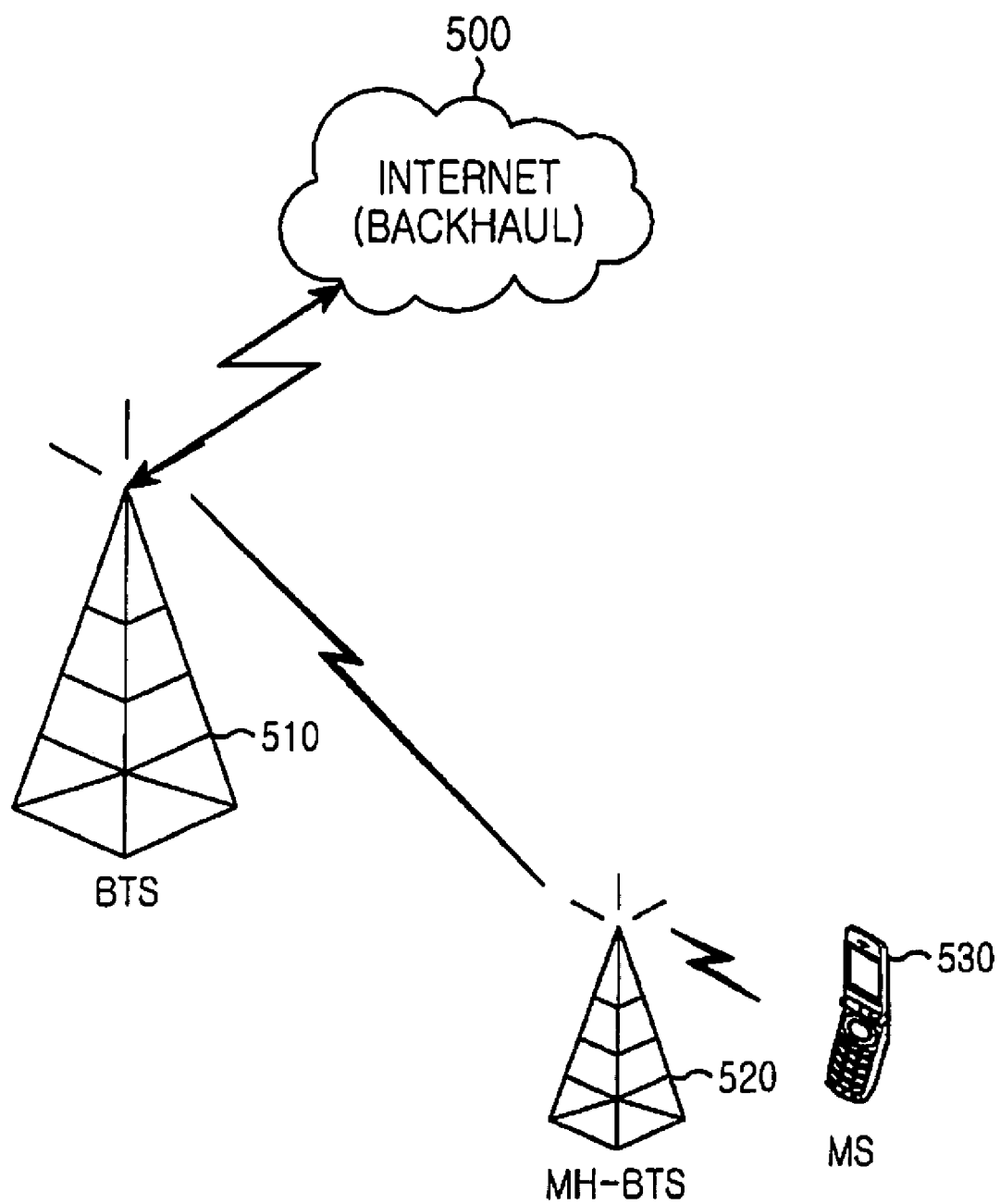
FIG. 5 illustrates a broadband wireless access communication network supporting a multihop system according to the present invention.

FIG. 5 illustrates a broadband wireless access communication network supporting a multihop system according to the present invention.

Referring to FIG. 5, an MS 530 transmits/receives data to/from a BTS 510 through an MH-BTS 520. The BTS 510 is connected to the Internet (backhaul) 500.

The MS 530 transparently manages an ARQ state between the MS 530 and the BTS 510 without regard to the MH-BTS 520.

In the case of the forward link, the MH-BTS 520 receives data from the BTS 510 and transmits the received data to the MS 530. Also, the MH-BTS 520 combines ACK/NACK for the received data and ARQ feedback information received from the MS 530 and reconfigures a dedicated ARQ feedback IE of the MH-BTS 520.

When the dedicated ARQ feedback IE is used, the BTS 510 does not retransmit the data that is successfully received by the MH-BTS 520. The present invention can also be applied to the reverse link.

An operation of the destination (a receiving node) is identical to that of the conventional destination. That is, the destination transmits to the MH-BTS 520 the ARQ feedback message generated using the conventional ARQ feedback IE format.

Figure 6:
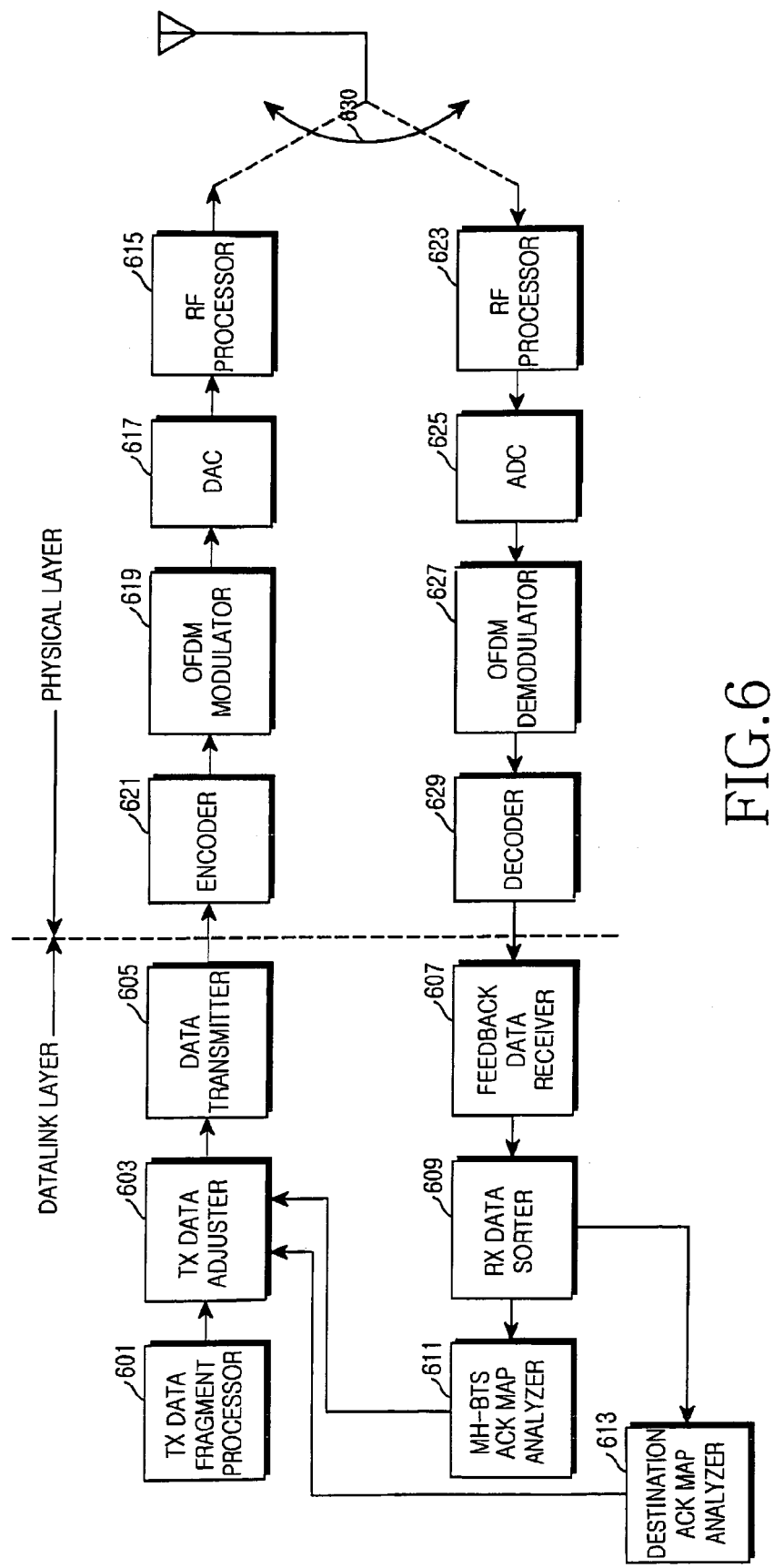
FIG. 6 is a block diagram of an ARQ apparatus of a source according to the present invention.

FIG. 6 is a block diagram of an ARQ apparatus of a source according to the present invention.

Referring to FIG. 6, the ARQ apparatus of the source is divided into a physical layer apparatus and a datalink layer apparatus. The physical layer apparatus includes a transmitter, a receiver, and a radio frequency (RF) switch 630.

Although the physical layer apparatus using an Orthogonal Frequency Division Multiplexing (OFDM) scheme will be taken as an example, the present invention can also be applied to a CDMA scheme and a Time Division Multiple Access (TDMA) scheme using a Time Division Duplex (TDD).

In addition, although the physical layer apparatus will be described focusing on a TDD system, the present invention can also be applied to a Frequency Division Duplex (FDD) system because the ARQ apparatus itself is independent of the physical layer apparatus.

The receiver includes an RF processor 623, an analog-to-digital converter (ADC) 625, an OFDM demodulator 627, and a decoder 629.

The RF processor 623 converts an RF signal received through an antenna into a baseband analog signal. The ADC 625 converts the baseband analog signal into a digital signal.

The OFDM demodulator 627 fast Fourier transform (FFT)-processes time-domain sample data received from the ADC 625 into frequency-domain data.

The decoder 629 decodes the frequency-domain data at a coding rate in a modulation scheme and outputs the decoded data to a feedback data receiver 607.

The transmitter includes an encoder 621, an OFDM modulator 619, a digital-to-analog converter (DAC) 617, and an RF processor 615.

The encoder 621 encodes data received from a data transmitter 605 in a modulation scheme. Examples of the modulation scheme include Binary Phase Shift Keying (BPSK), Quadrature Phase Shift Keying (QPSK), 16 Quadrature Amplitude Modulation (16QAM), and 64QAM.

The OFDM modulator 619 inverse FFT (IFFT)-processes the data received from the encoder 621 to output time-domain sample data (OFDM symbol).

The DAC 617 converts the time-domain sample data into an analog signal. The RF processor 615 converts the analog signal into an RF signal and transmits the RF signal through the antenna.

Upon receipt of data, the RF switch 630 connects the receiver to the antenna. Upon transmission of data, the RF switch 630 connects the transmitter to the antenna.

In the datalink layer apparatus, a transmit (TX) data fragment processor 601 fragments data to be transmitted, inserts header information, and transmits to a TX data adjuster 603.

The TX data adjuster 603 manages a data transmission scheduling and a TX data processing and transmits the data to the data transmitter 605.

The data transmitter 605 transmits the data to the encoder 621.

The feedback data receiver 607 receives data from the decoder 629 and transmits the received data to an RX data sorter 609.

The RX data sorter 609 sorts the received data into data received from the destination and data received from the MH-BTS, and transmits the sorted data to an MH-BTS ACK MAP analyzer 611 or a destination ACK MAP analyzer 613.

The MH-BTS ACK MAP analyzer 611 analyzes the data received from the MH-BTS and transmits the analysis information to the TX data adjuster 603.

The destination ACK MAP analyzer 641 analyzes the data received from the destination and transmits the analysis data to the TX data adjuster 603.

The TX data adjuster 303 determines whether to retransmit the data and adjust the ARQ_TX_WINDOW according to the analysis result. When ACK for the transmitted data does not arrive for a predetermined time, the TX data adjuster 603 discards the corresponding data.

Figure 7:
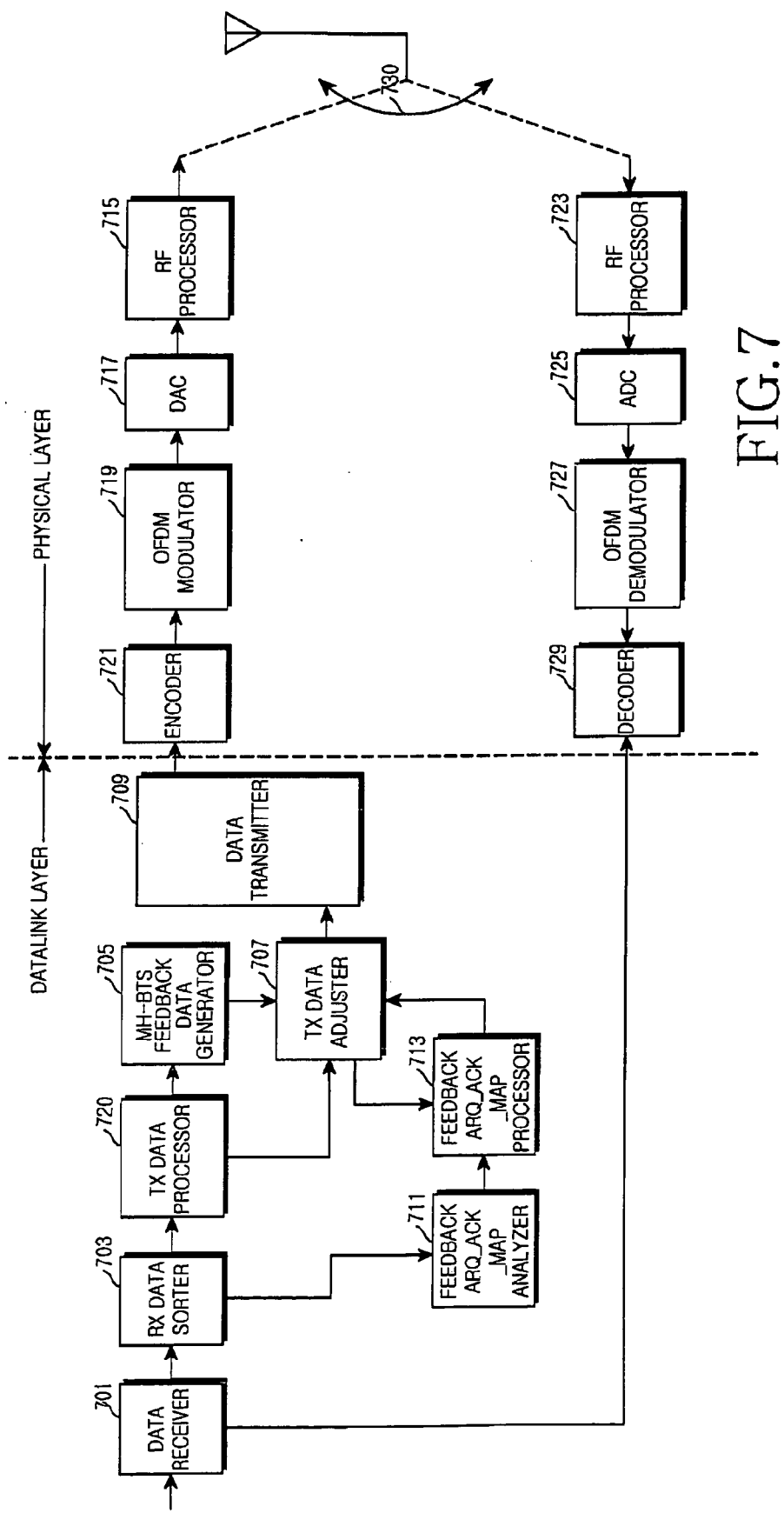
FIG. 7 is a block diagram of an ARQ apparatus of an MH-BTS according to the present invention.

FIG. 7 is a block diagram of an ARQ apparatus of an MH-BTS according to the present invention.

Referring to FIG. 7, the ARQ apparatus of the MH-BTS is divided into a physical layer apparatus and a data link layer apparatus. The physical layer apparatus includes a transmitter, a receiver, and an RF switch 730.

Although the physical layer apparatus using an OFDM scheme will be taken as an example, the present invention can also be applied to a CDMA scheme and a TDMA scheme using a TDD.

In addition, although the physical layer apparatus will be described focusing on a TDD system, the present invention can also be applied to an FDD system because the ARQ apparatus itself is independent of the physical layer apparatus.

Elements and functions of the physical layer apparatus illustrated in FIG. 7 are identical to those of the physical layer apparatus illustrated in FIG. 6, but the significant difference is that a data transmitter 709 transmits data to an encoder 721 and a decoder 729 transmits data to a data receiver 701.

A data receiver 701 receives data from the decoder 729 and transmits the received data to an RX data sorter 703.

The RX data sorter 703 sorts the received data into data received from the source and data received from the destination. When the received data is the data transmitted from the source, the RX data sorter 703 transmits the corresponding data to a TX data processor 720.

The TX data processor 720 processes the data received from the RX data sorter 703 and transmits the processed data to a TX data adjuster 707 and an MH-BTS feedback data generator 705 in order to generate an MH-BTS feedback data.

The MH-BTS feedback data generator 705 generates feedback data indicating RX success/fail of data transmitted from the TX data processor 720, and transmits the feedback data to the TX data adjuster 707.

The TX data adjuster 707 manages a data transmission scheduling, a TX data processing, and a retransmission. Also, the TX data adjuster 707 transmits to the data transmitter 709 the feedback data to be transmitted to the source or the original data to be transmitted to the destination. The TX data adjuster 707 transmits to a feedback ARQ_ACK_MAP processor 713 the MH-BTS feedback data generated from the MH-BTS feedback data generator 705.

The data transmitter 709 transmits to the encoder 721 the data to be transmitted from the source to the destination, the feedback data to be transmitted from the destination to the source, or the feedback data to be transmitted from the MH-BTS to the source.

When the received data is the feedback data (ACK) transmitted from the destination, the RX data sorter 703 transmits the destination feedback data to a feedback ARQ_ACK_ MAP analyzer 711. In the presence of a plurality of MH-BTSs, the RX data sorter 703 also transmits to the feedback ARQ_ACK_MAP analysis 711 the feedback data received from lower MH-BTSs.

The feedback ARQ_ACK_MAP analyzer 711 analyzes the received destination feedback data to determine if the destination successfully receives the data, and transmits the analysis result to the feedback ARQ_ACK_MAP processor 720.

The feedback ARQ_ACK_MAP 713 combines the destination feedback data and the MH-BTS feedback data received from the TX data adjuster 707 and generates feedback data to be transmitted to the source.

The generated feedback data is transmitted to the TX data adjuster 707, and the TX data adjuster 707 transmits the feedback data to the data transmitter 709.

An operation of the MH-BTS having the ARQ apparatus of FIG. 7 will be described below.

The MH-BTS transmits the ARQ feedback message to the source using the dedicated ARQ feedback IE format. The dedicated ARQ feedback IE format is identical to the conventional ARQ feedback IE format, but it is different in the usage of the selective ACK MAP.

When the generic MAC header indicates the MH-BTS, the source recognizes that the ARQ feedback message is received from the MH-BTS, and analyzes the selective ACK MAP according to the dedicated ARQ feedback IE format.

The selective ACK MAP of the dedicated ARQ feedback IE format will be described below. Table 5 below shows three cases that may occur when the MH-BTS receives data from the source and transmits the received data to the destination.

TABLE 5

| Case | Description |
| --- | --- |
| A. | MH-BTS RX success, destination RX success |
| B. | MH-BTS RX success, destination RX fail |
| C. | MH-BTS RX fail, destination RX fail |

Case A represents that both the MH-BTS and the destination successfully receive the data from the source. Thus, ARQ_TX_WINDOW_START of the source, and ARQ_RX_WINDOW_START and ARQ_TX_HIGHEST_BSN of the destination must be adjusted.

Case B represents that the MH-BTS successfully receives the data from the source, but the destination fails to receive the data. When the MH-BTS transmits the ARQ feedback message of the destination, the MH-BTS receives duplicate data that has been already received. Thus, the MH-BTS must retransmit the data that fails to be received by the destination.

Case C represents that both the MH-BTS and the destination fail to receive the data. Thus, the MH-BTS must again receive the data from the source.

Because the data transmission method of the source is different depending on the respective cases, the source must know the data RX states of the MH-BTS and the destination.

Table 6 below shows the data RX success/fail of the MH-BTS and the destination. The information about the data RX success/fail of the MH-BTS and the destination is transmitted through the selective ACK MAP of the dedicated ARQ feedback message.

TABLE 6

| Case | Description | Expression |
| --- | --- | --- |
| A. | MH-BTS RX success, destination RX success | 11 (or 00) |
| B. | MH-BTS RX success, destination RX fail | 10 (or 01) |
| C. | MH-BTS RX fail, destination RX fail | 0 (or 1) |

When the information is expressed in 2 bits, the first bit indicates the RX state of the MH-BTS and the second bit indicates the RX state of the destination. The RX success is set to "1" and the RX fail is set to "0". In the ACK MAP, the unset fields are filled with "0".

The ARQ feedback IE format according to the present invention is defined in the same way as in the related art. The selective ACK MAP has a size of 16 bits and the number of ACK MAPs is defined as 1 to 4. Thus, a total size of the selective ACK MAP is set to 32 bits, 48 bits, 64 bits, or 80 bits.

According to the related art, because each bit of the selective ACK MAP indicates the success/fail of one block, 32-bit selective ACK MAP can indicate the TX states of minimum 16 blocks to maximum 32 blocks.

If the selective ACK MAP cannot be configured using the 16 bits, the size of one ACK MAP (for example, two more bits are required when 15 bits are used), the ACK MAP is expressed using the last bit of the current selective ACK MAP and the first bit of a next selective ACK MAP.

Figure 8:
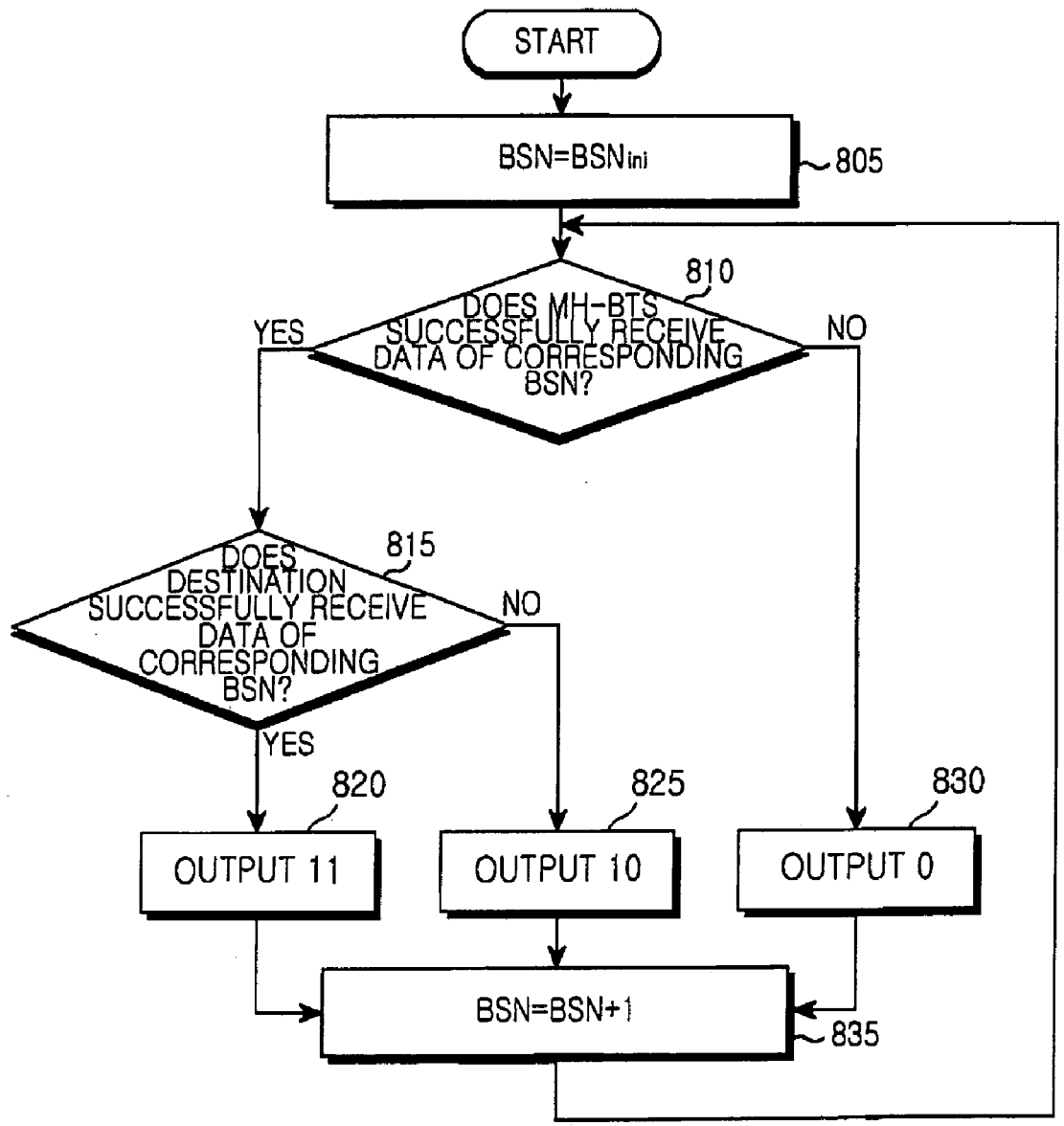
FIG. 8 is a flowchart illustrating an MH-BTS operation of generating a selective ACK MAP according to the present invention.

FIG. 8 is a flowchart illustrating an MH-BTS operation of generating the selective ACK MAP according to the present invention.

Referring to FIG. 8, the MH-BTS initializes BSN to $BSN_{ini}$ in step 805. The $BSN_{ini}$ is the smallest BSN of ARQ blocks contained in the ARQ feedback IE.

When the MH-BTS successfully receives data (ARQ block) corresponding to the BSN in step 810, it is determined in step 815 if the destination successfully receives data (ARQ block) corresponding to the BSN.

When the destination successfully receives the data in step 815, "11" is output in step 820 and the BSN increases by 1 in step 835.

When the destination fails to receive the data in step 815, "10" is output in step 825 and the BSN increases by 1 in step 835.

When the MH-BTS fails to receive the data in step 810, "0" is output in step 830 and the BSN increases by 1 in step 835.

Then, after step 835 the process returns to step 810.

Figure 9:
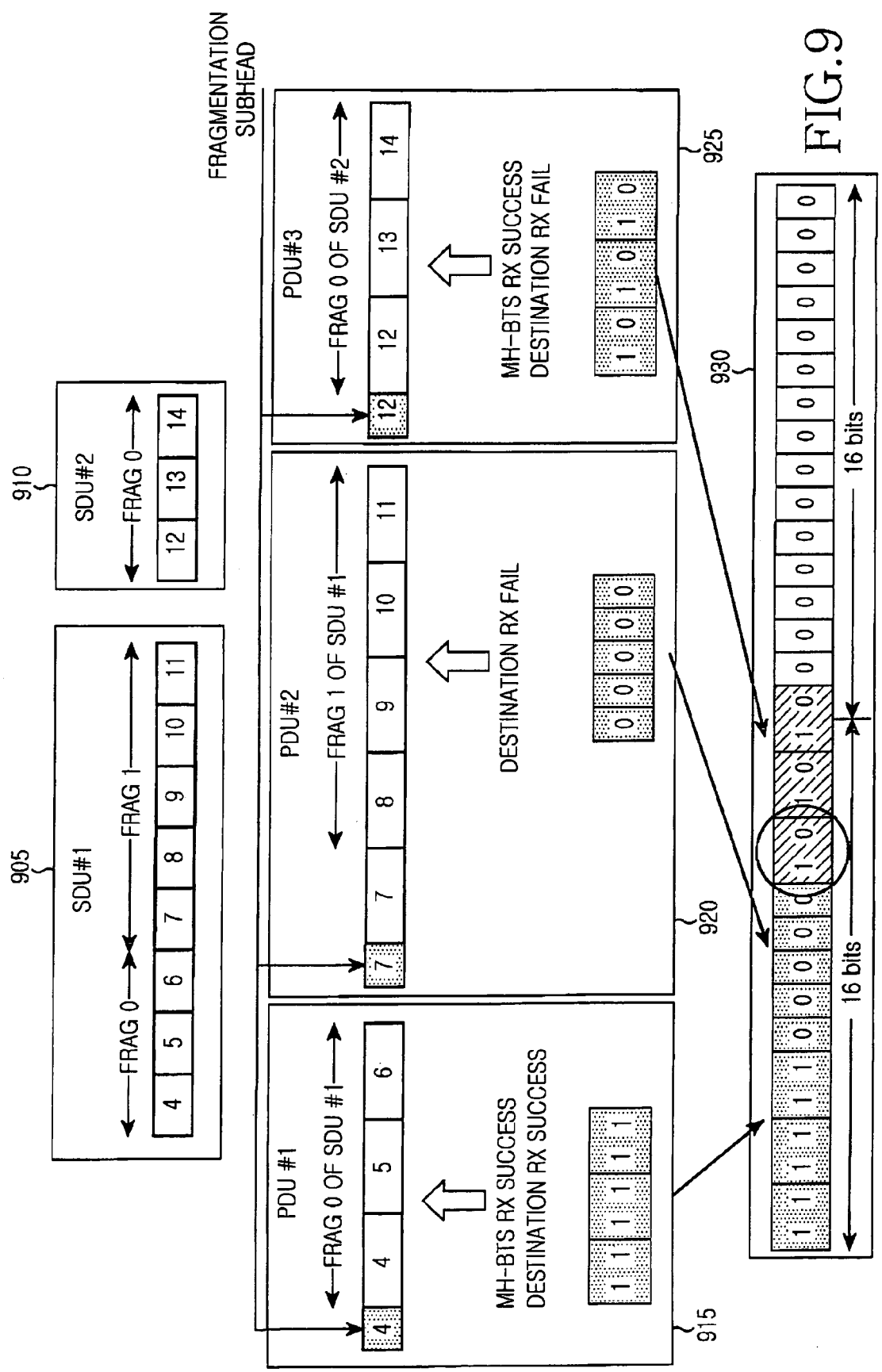
FIG. 9 illustrates an example of the selective ACK MAP according to the present invention.

FIG. 9 illustrates an example of the selective ACK MAP according to the present invention.

Referring to FIG. 9, an SDU#1 905 and an SDU#2 910 are fragmented into three PDUs 915, 920 and 925. The PDU#1 915 is successfully received at the MH-BTS and the destination, the PDU#2 920 fails to be received at the MH-BTS, and the PDU#3 925 is successfully received at the MH-BTS but fails to be received at the destination.

In this case, ACK for ARQ blocks of the PDU#1 915 having BSNs of 4-6 is "111111", ACK for ARQ blocks of the PDU#2 920 having BSNs of 7-11 is "00000", and ACK for ARQ blocks of the PDU#3 having BSNs of 12-14 is "101010".

In the ACK MAP 930 where the ACKs are connected in sequence, when the 15 bits are filled and two bits "11" must be further inserted, the two bits "11" are inserted using the last bit of the first 16 bits of the selective ACK MAP 930 and the first bit of the next selective ACK MAP, and the remaining bits of the next selective ACK MAP are filled with "0".

An operation of the source having the ARQ apparatus of FIG. 6 will be described below. When the source receives the ARQ feedback message with respect to data transmitted from the destination without passing through the MH-BTS, it operates in the same manner as in the related art.

Figure 10:
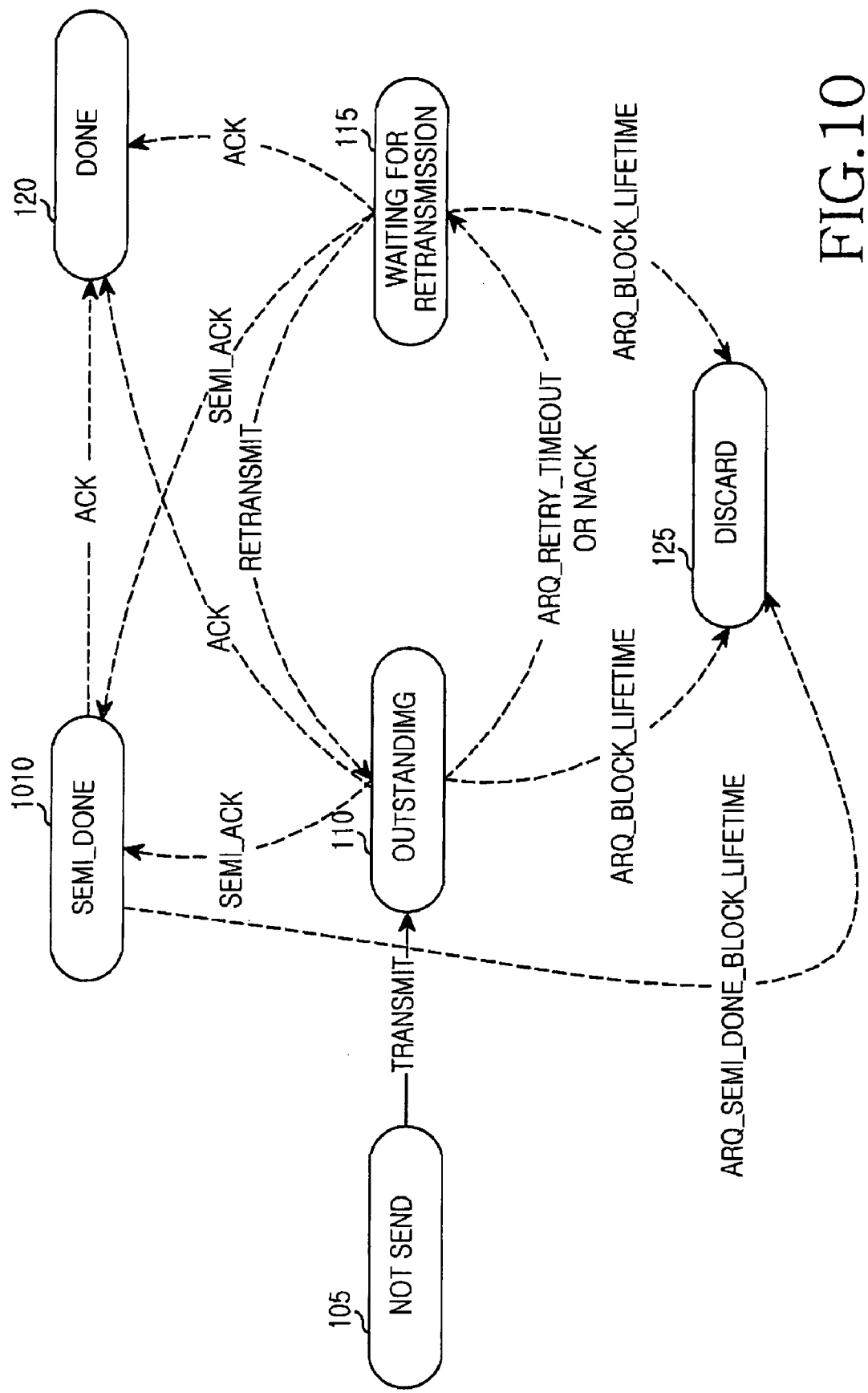
FIG. 10 illustrates the transition of ARQ operation states in a source according to the present invention.

FIG. 10 illustrates transition of ARQ operation states in the source according to the present invention.

Figure 1:
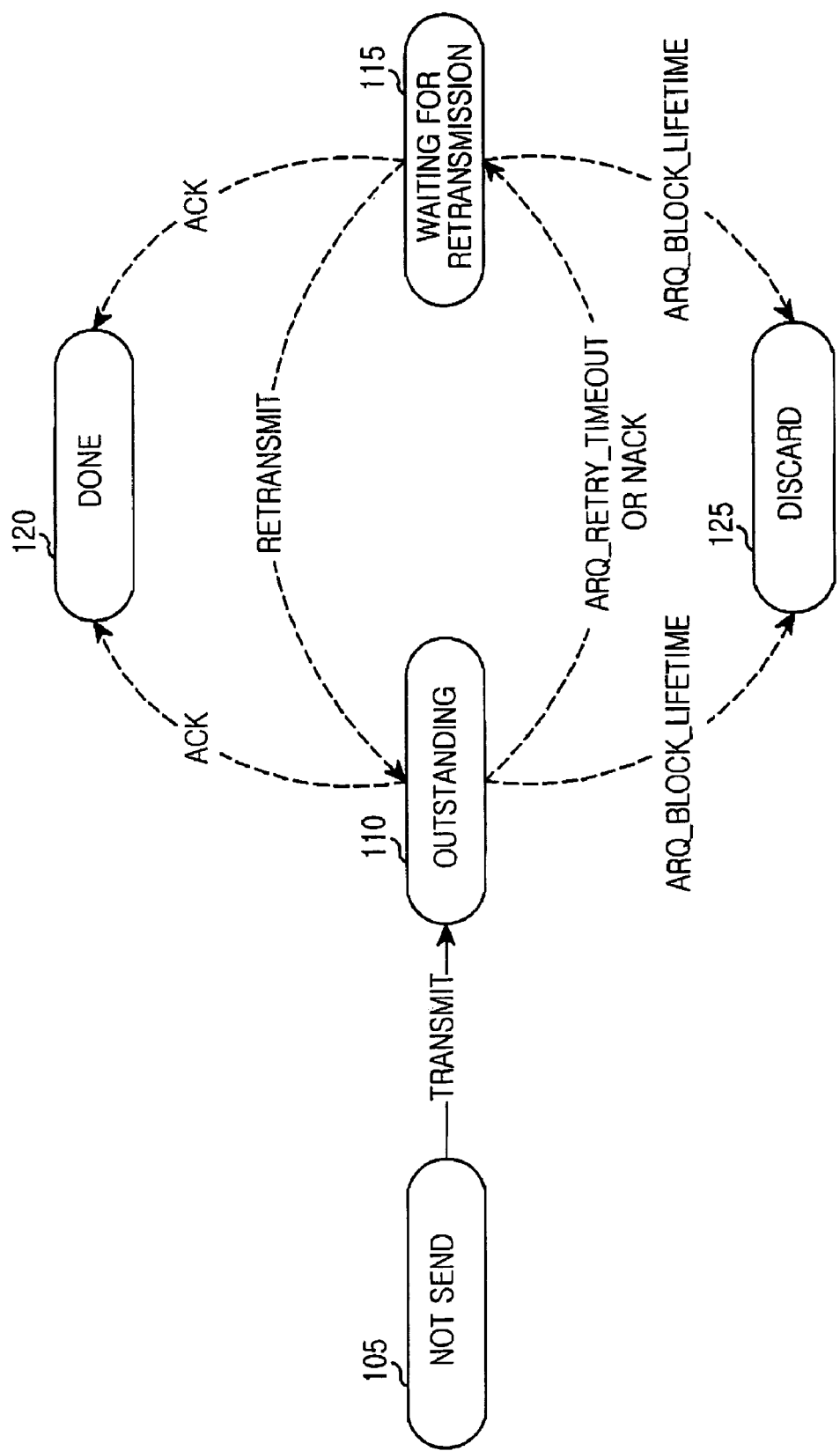
FIG. 1 illustrates the transition of ARQ operation states in a source according to the related art.
Figure 2:
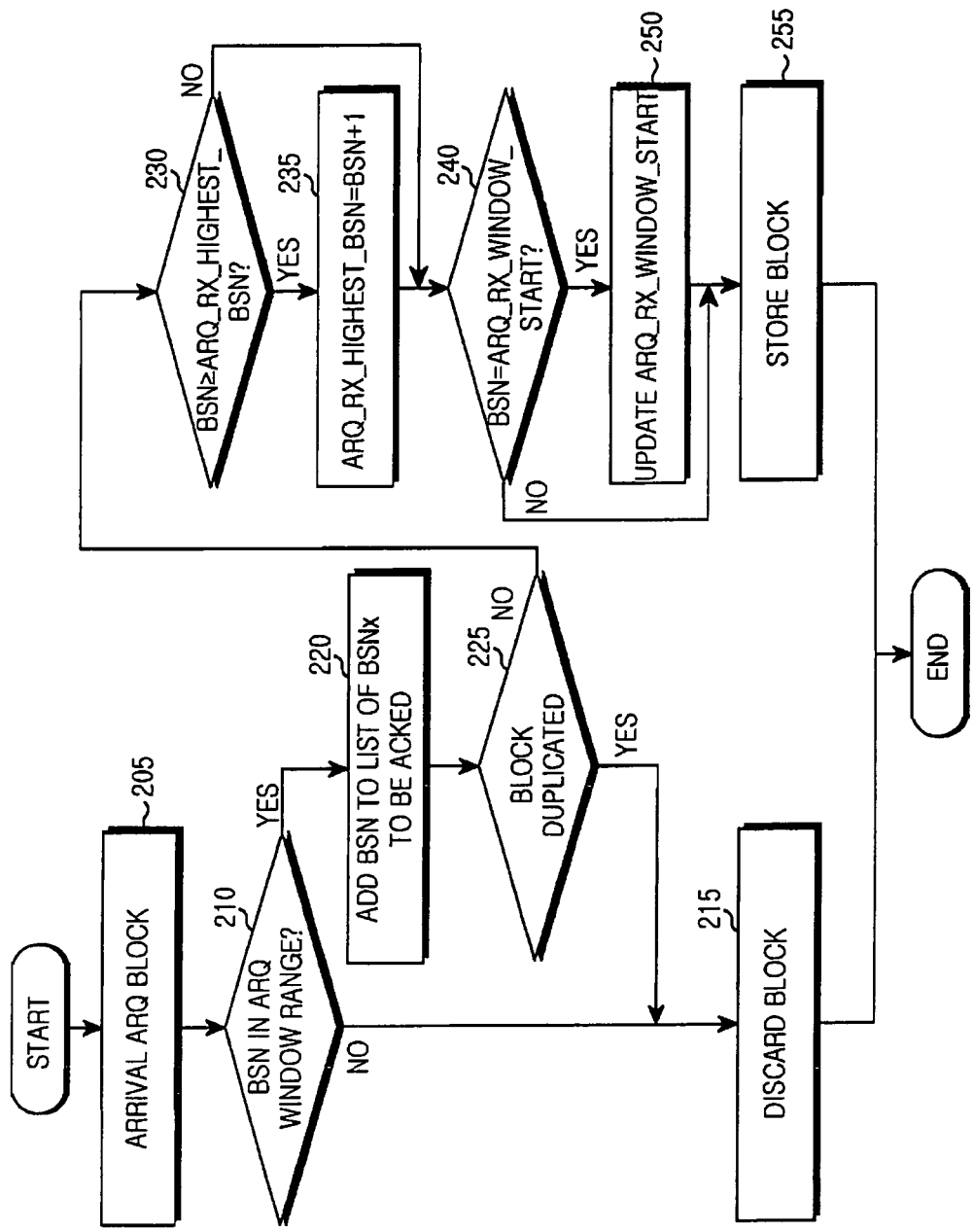
FIG. 2 is a flowchart illustrating a conventional ARQ receiving process of a destination.
Figure 3:
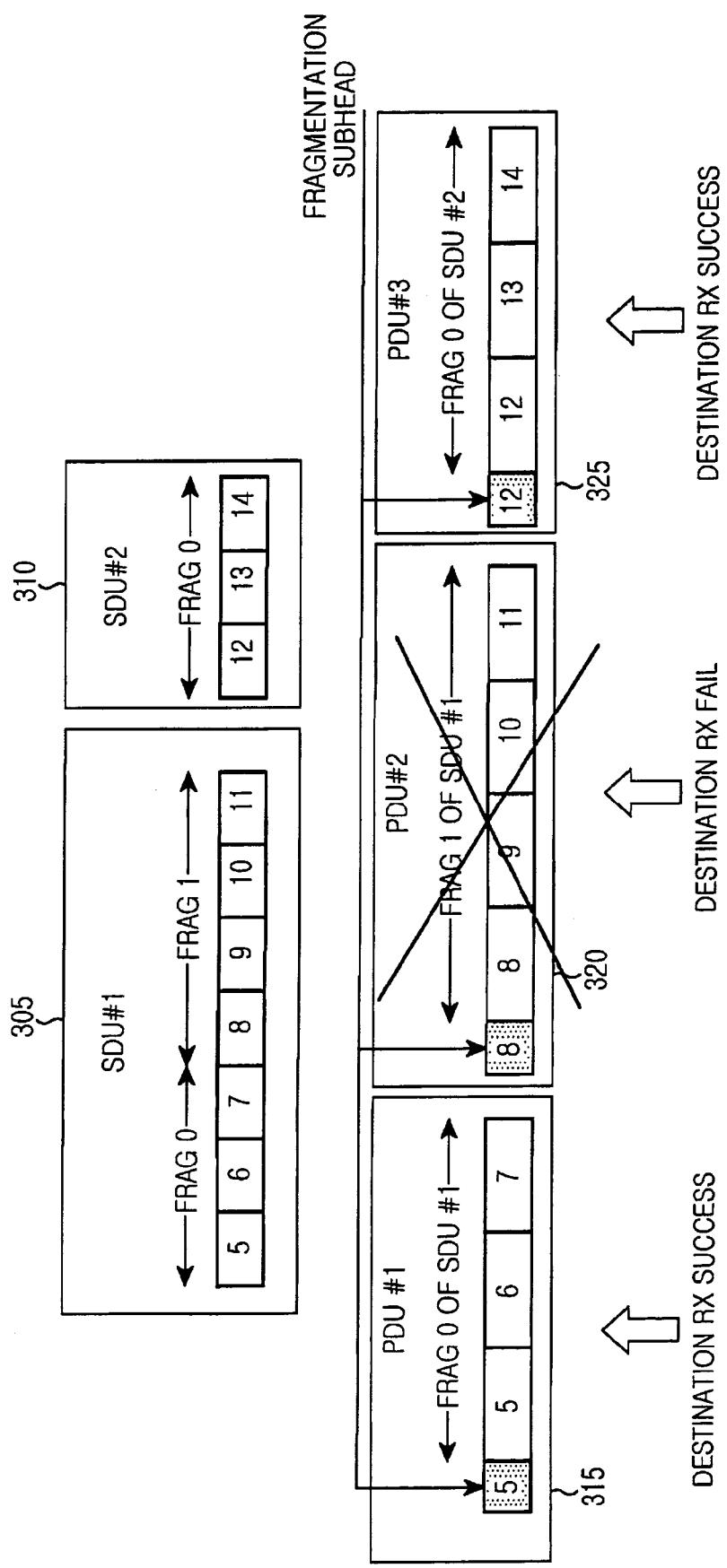
FIG. 3 illustrates a conventional transmission environment of an ARQ feedback IE.
Figure 4:
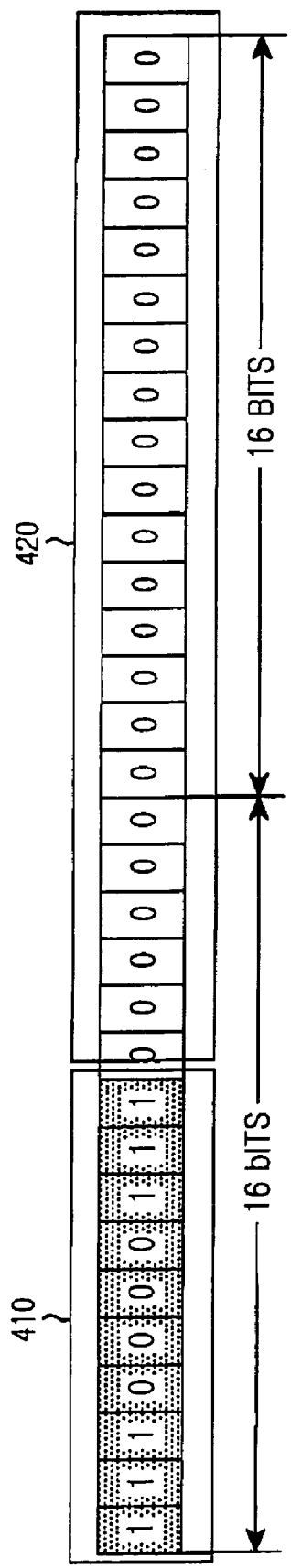
FIG. 4 illustrates an example of a conventional ACK MAP.

Referring to FIG. 10, the transition of the ARQ operation states in the source according to the present invention is similar to that of FIG. 1, but it is different in that a "semi_done" state 1010 is added.

The source changes to the "semi_done" state 1010 when the source receives SEMI_ACK in the outstanding state 110 or the "waiting for retransmission" state 115.

The SEMI_ACK is a signal indicating that the MH-BTS successfully receives the ARQ block but the destination fails to receive the ARQ block. NACK is a signal indicating that the MH-BTS fails to receive the ARQ block.

When the source fails to receive ACK within ARQ_SEMI_DONE_BLOCK_LIFETIME in the semi_done state 1010, the source changes to a discard state 125.

The ARQ_SEMI_DONE_BLOCK_LIFETIME indicates time during which the MH-BTS receives ACK from the destination because of the retransmission success and can transmit ACK to the source.

When the source receives the ACK, the source changes to a done state 120. In the semi_done state 1010, the MH-BTS successfully receives the corresponding ARQ block from the source but the destination does not still receive the ARQ block. Thus, the MH-BTS retransmits the corresponding ARQ block to the destination.

When the source does not receive the ACK within the ARQ_SEMI_DONE_BLOCK_LIFETIME, the source changes to a discard state 125 and discards the corresponding ARQ block.

When the source receives the ARQ feedback message with respect to data transmitted from the destination without passing through the MH-BTS, the source operates in the same manner as in the related art.

Figure 11:
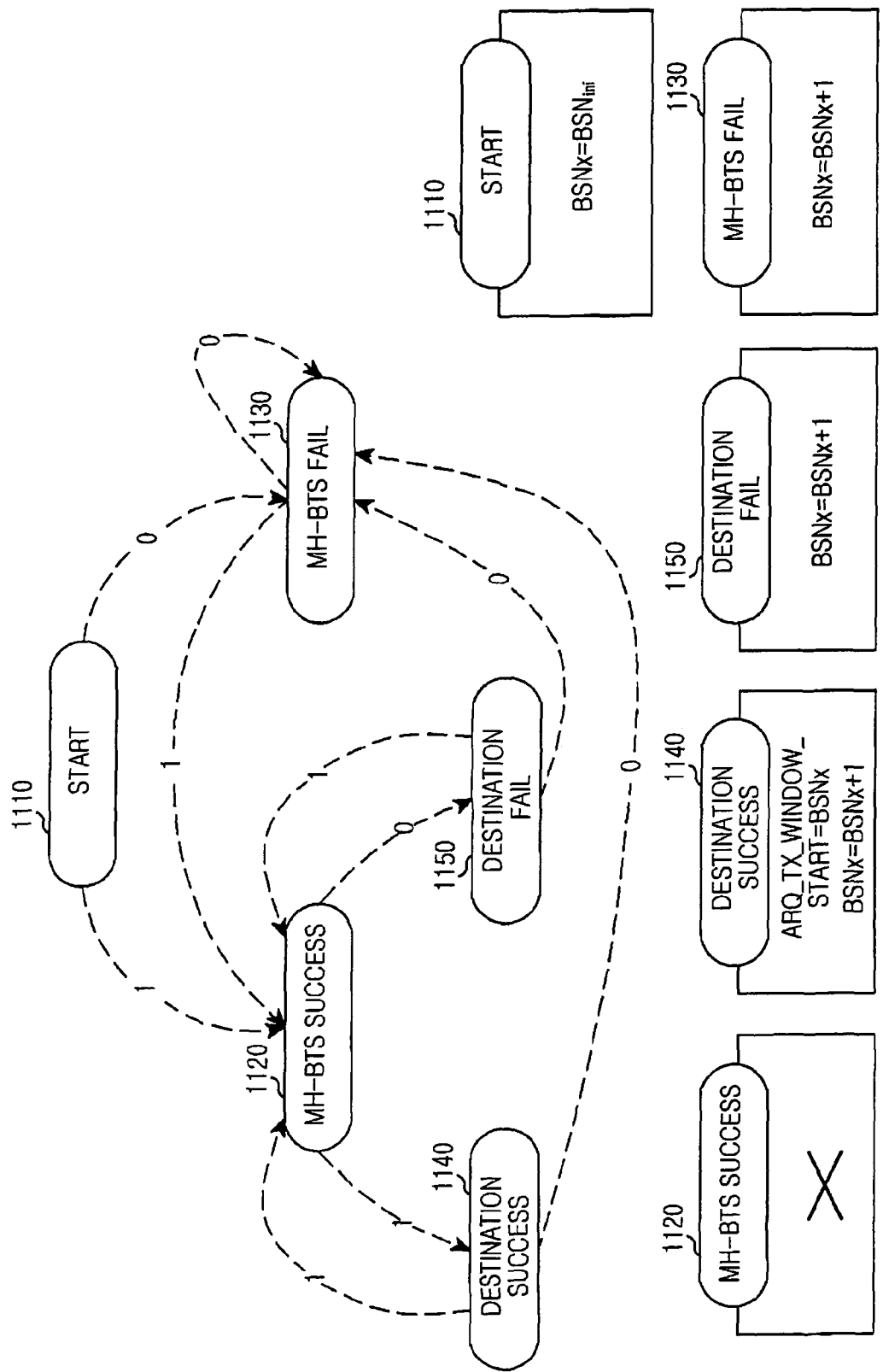
FIG. 11 illustrates a process of analyzing the selective ACK MAP at the source according to the present invention.

FIG. 11 illustrates a process of analyzing the selective ACK MAP at the source according to the present invention.

Referring to FIG. 11, the source initializes BSN to $BSN_{ini}$ in a start state 1110. The start state 1110 indicates an initial state when the source receives an ARQ feedback message from the MH-BTS.

The $BSN_{ini}$ is the smallest BSN of ARQ blocks contained in the ARQ feedback IE. In the process of analyzing the selective ACK MAP, the source processes bits received in sequence and changes to a next state. The source changes to the state an according to a number input at each step. The change of the state in the source is indicated by arrows.

When "1" is input in the start state 1110, the source changes to an MH-BTS success state 1120 indicating that the MH-BTS successfully receives an ARQ block having $BSN_x$.

A destination success state 1140 indicates that the destination successfully receives the ARQ block having $BSN_x$. Thus, the source recognizes that the ACK for the corresponding ARQ block is generated.

Because the source recognizes the ACK for the ARQ block having $BSN_x$, the source adjusts ARQ_TX_WINDOW to increase ARQ_TX_WINDOW_START to $BSN_x+1$.

After adjusting the ARQ_TX_WINDOW, $BSN_x$ increases by 1 in order to check the TX state of an ARQ block having a next BSN.

A destination fail state 1150 indicates that the MH-BTS successfully receives the ARQ block having $BSN_x$ but the destination fails to receive the corresponding ARQ block.

The source recognizes that the SEMI_ACK for the ARQ block having $BSN_x$ is generated. Thus, $BSN_x$ increases by 1 in order to check the TX state of an ARQ block having a next BSN.

In the destination success state 1140, the destination fail state 1150, and the MH-BTS fail state 1130, the source can check the TX state (ACK, SEMI_ACK, NACK) for one ARQ block. Because the ARQ block having $BSN_x$ successfully arrives at the destination in the destination success state 1140, the source changes to the done state (120 in FIG. 10) and the ARQ_TX_WINDOW_START of the source is updated.

The destination fail state 1150 indicates that the MH-BTS successfully receives the ARQ block having $BSN_x$ from the source but destination fails to receive the corresponding ARQ block. Thus, the source changes to the semi_done state (1010 in FIG. 10). When the source receives the ACK within the ARQ_SEMI_DONE_BLOCK_LIFETIME, the source changes to the done state (120 in FIG. 10) and updates the ARQ_TX_WINDOW_START.

When the source fails to receive the ACK within the ARQ_SEMI_DONE_BLOCK_LIFETIME, the source discards the corresponding ARQ block. The MH-BTS fail state 1130 indicates that the MH-BTS fails to receive the ARQ block having $BSN_x$. Thus, the source changes to the "waiting for retransmission" state (115 in FIG. 10) and retransmits the ARQ block having $BSN_x$ to the MH-BTS.

Figure 12:
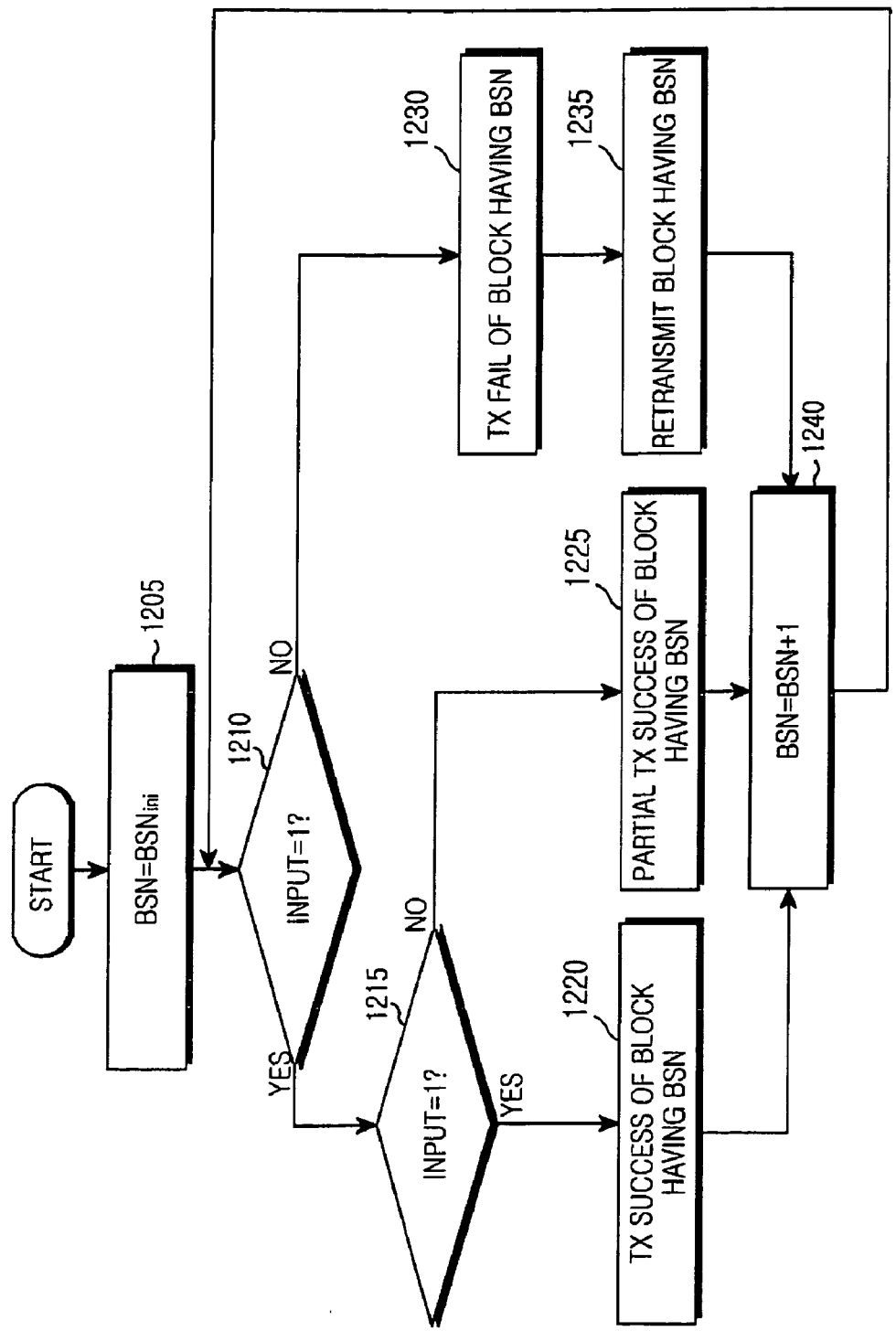
FIG. 12 is a flowchart illustrating a process of analyzing the selective ACK MAP at the source according to the present invention.

FIG. 12 is a flowchart illustrating a process of analyzing the selective ACK MAP at the source according to the present invention.

Referring to FIG. 12, the source initializes BSN to $BSN_{ini}$ in step 1205. The $BSN_{ini}$ is the smallest BSN of ARQ blocks contained in the ARQ feedback IE.

Then, the selective ACK MAP analysis begins. Bits from a most significant bit (MSB) to a least significant bit (LSB) are input on a one by one basis and processed.

In step 1210, the source determines if the first input is "1".

When the input is "1" in step 1210, the process proceeds to step 1215 to determine if a next input is "1".

When the input is "1" in step 1215, i.e., if the two successive bits are "1", the process proceeds to step 1220 to recognize that the corresponding ARQ block is successfully transmitted up to the destination. Then, BSN increases by 1 in step 1240.

When the input is "0" in step 1215, the process proceeds to step 1225 to recognize that the corresponding ARQ block is successfully transmitted only to the MH-BTS. Then, BSN increases by 1 in step 1240.

When the input is "0" in step 1210, the process proceeds to step 1230 to recognize that even the MH-BTS fails to receive the corresponding ARQ block. In step 1235, the source recognizes that it must retransmit the corresponding ARQ block to the MH-BTS. Then, BSN increases by 1 in step 1240 and then returns to step 1210.

Figure 13:
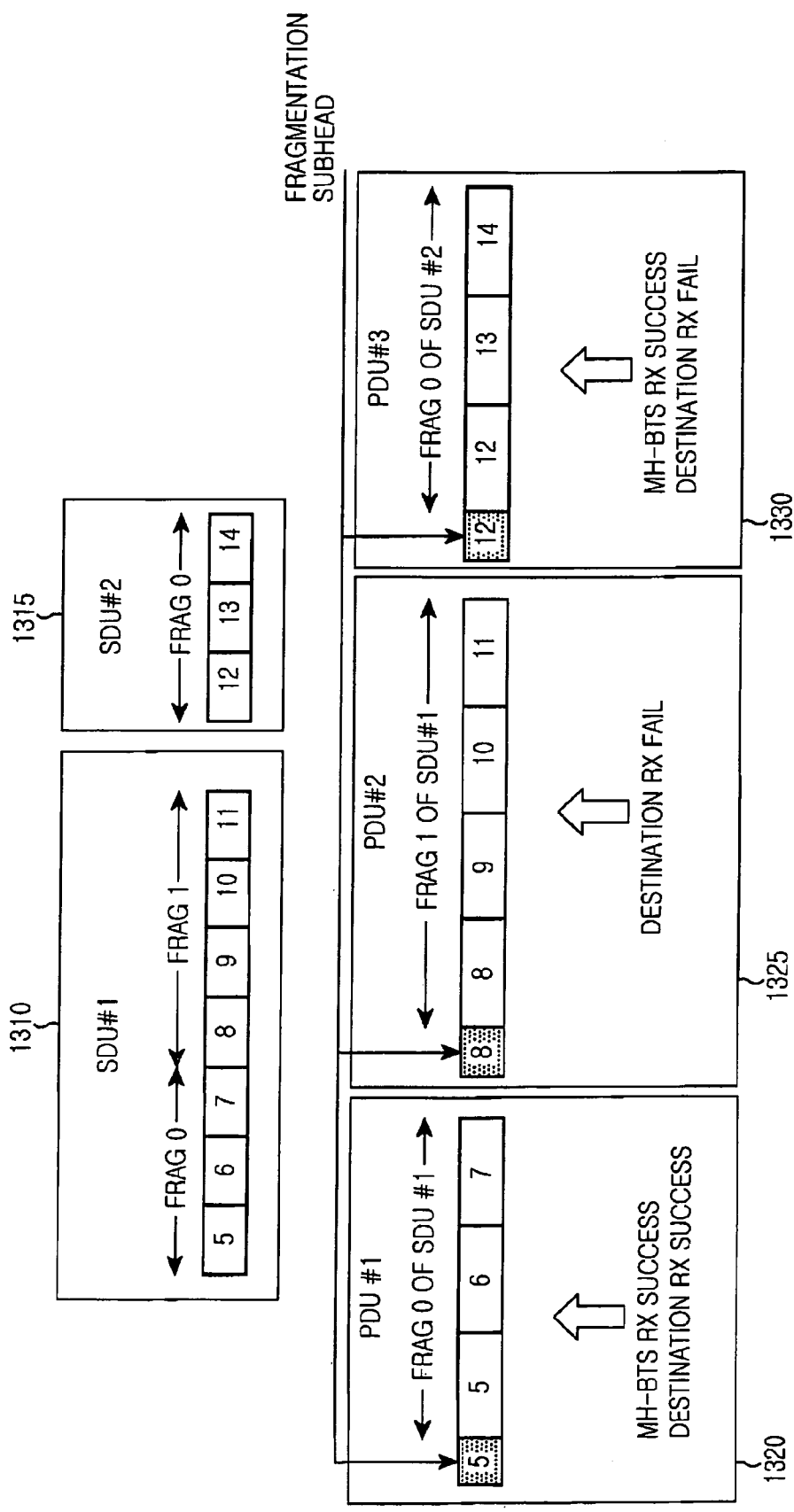
FIG. 13 illustrates SDUs and PDUs in data transmission according to the present invention.

FIG. 13 illustrates SDUs and PDUs in data transmission according to the present invention.

Referring to FIG. 13, an SDU#1 1310 and an SDU#2 are fragmented into three PDUs 1320, 1325 and 1330. Fragmentations are inserted in front of the respective PDUs 1320, 1325 and 1330 in order to notify the information about the PDUs 1320, 1325 and 1330.

Figure 14:
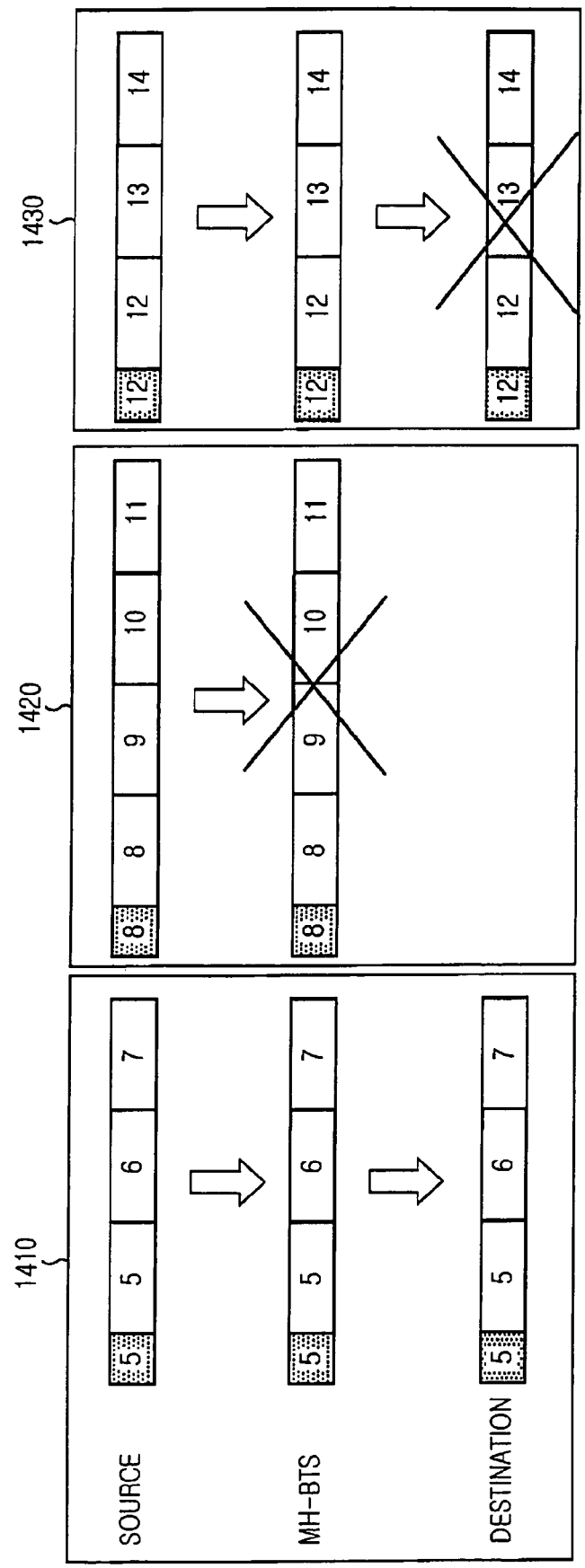
FIG. 14 illustrates PDU TX success/fail cases according to the present invention.

FIG. 14 illustrates PDU TX success/fail cases according to the present invention.

Referring to FIG. 14, step 1410 indicates that both the MH-BTS and the destination successfully receive the PDU#1 1320, step 1420 indicates that the MH-BTS fails to receive the PDU#2 1320, and step 1430 indicates that the MH-BTS successfully receives the PDU#3 1330 but the destination fails to receive the PDU#3.

Figure 15:
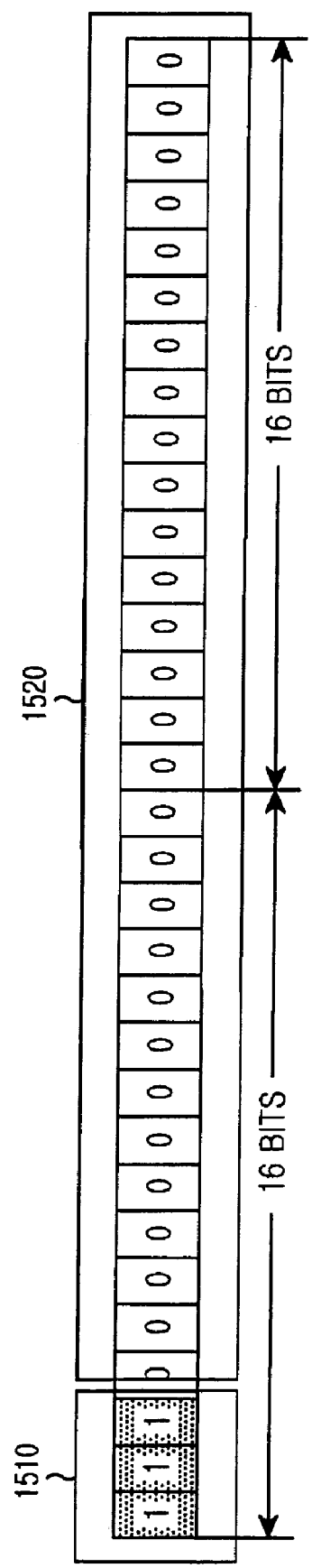
FIG. 15 illustrates a selective ACK MAP generated at the destination according to the present invention.

FIG. 15 illustrates the selective ACK MAP generated at the destination according to the present invention.

Referring to FIG. 15, in the selective ACK MAP for the ARQ blocks received by the destination in the situation of FIG. 14, the first 3 bits 1510 are set to "1", indicating the RX success of the ARQ blocks having BSNs of 5-7. That is, the first 3 bits indicate that the PDU#1 1320 is successfully received.

The remaining bits 1520 set to "0" indicate that the ARQ blocks having BSNs of 8 or more have failed to be received. That is, the bits 1520 indicate that the PDU#2 1325 and PDU#3 1330 have failed to be received.

Table 8 shows the ARQ feedback IE of the destination, including the RX results.

TABLE 8

| Name | Size | Description |
| --- | --- | --- |
| CID | ###### | Connection ID |
| LAST | 1 | Indicates the last ARQ feedback IE |
| ACK Type | 0x0 | Indicates the use of selective ACK entry |
| BSN | 5 | Indicates the smallest BSN of the blocks contained in ACK MAP |
| Number of ACK MAPs | 0x0 | A total size of ACK MAP is 32 bits |
| Selective ACK MAP | 1111 0000 0000 0000 0000 0000 0000 0000 | Contents of ACK MAP |

The ARQ feedback IE of Table 8 is transmitted to the MH-BTS.

Figure 16:
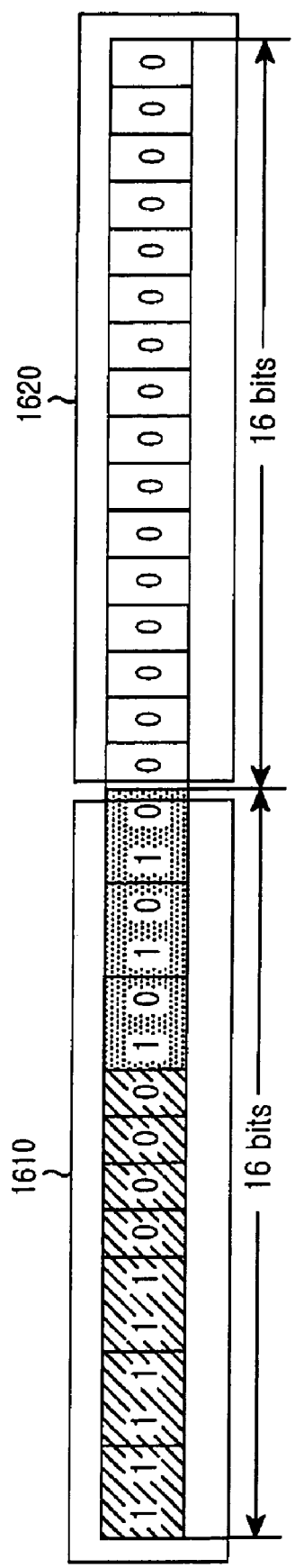
FIG. 16 illustrates a selective ACK MAP generated at the MH-BTS according to the present invention.

FIG. 16 illustrates the selective ACK MAP generated at the MH-BTS according to the present invention.

Referring to FIG. 16, the MH-BTS reconfigures the received selective ACK MAP generated at the destination in FIG. 15.

The selective ACK MAP is divided into a first area 1610 indicating the RX success/fail and a second area 1620 filled with "0". In the first area 1610, first 6 bits indicate information about the blocks having BSNs of 5-7, next 4 bits indicate information about the blocks having BSNs of 8-11, and next 6 bits indicate information about the blocks having BSNs of 12-14.

That is, the PDU#1 1320 is successfully received at both the MH-BTS and the destination, the PDU#2 1325 fails to be received at the MH-BTS, and the PDU#3 1330 is successfully received at the MH-BTS but fails to be received at the destination.

Table 9 below shows the ARQ feedback IE of the destination, including the RX results.

TABLE 9

| Name | Size | Description |
| --- | --- | --- |
| CID | ###### | Connection ID |
| LAST | 1 | Indicates the last ARQ feedback IE |
| ACK Type | 0x0 | Indicates the use of selective ACK entry |
| BSN | 5 | Indicates the smallest BSN of the blocks contained in ACK MAP |
| Number of ACK MAPs | 0x0 | A total size of ACK MAP is 32 bits |
| Selective ACK MAP | 1111 1100 0010 1010 0000 0000 0000 0000 | Contents of ACK MAP |

The CID of the generic MAC header in the ARQ feedback message including the ARQ feedback IE is transmitted using the CID of the MH-BTS. Thus, using the generic MAC header, the source can recognize that the ARQ feedback message is received from the MH-BTS. Also, using the CID of the ARQ feedback IE, the source can determine which destination the message is associated with.

After the source recognizes that the ARQ feedback message is received from the MH-BTS, the ACK MAP processing is done as follows.

Since the BSN is 5, the processing begins from the ARQ block having BSN of 5 and the selective ACK MAP is analyzed using the algorithm of FIG. 11. From the analysis of the received ACK MAP, the source can recognize that the blocks having BSNs of 5-7 successfully arrive at the destination. Thus, ARQ_TX_WINDOW is adjusted.

Because the ARQ blocks having BSNs of 5-7 are successfully transmitted, ARQ_TX_WINDOW_START increases to 8.

From the analysis of the next ACK MAP, the source recognizes that the blocks having BSNs of 8-11 fail to be transmitted to the MH-BTS. Thus, the source changes to the "waiting for retransmission" state (115 in FIG. 10) and retransmits the corresponding ARQ block to the MH-BTS.

When the ACK is not receives within ARQ_BLOCK_LIFETIME, the source discards the corresponding ARQ block. When the ACK for the blocks having BSNs of 8-11 is received before the corresponding ARQ block is discarded, ARQ_TX_WINDOW_START increases to 12.

From the analysis of the next ACK MAP, the source recognizes that the blocks having BSNs of 12-14 are successfully received at the MH-BTS but fail to be received at the destination. Thus, the source changes to the semi_done state 1010 and waits for ACK reception without retransmission.

When the ACK is not received within ARQ_SEMI_DONE_BLOCK_LIFETIME, the corresponding ARQ block is discarded. When the ACK for the blocks having BSNs of 12-14 is received within ARQ_SEMI_ DONE_BLOCK_LIFETIME, ARQ_TX_WINDOW_ START increases to 15.

The operation of the source according to the present invention will be described below. The above-described steps are applied to the case in which the number of MH-BTSs is 2, i.e., 2 hops. When the 2-hop configuration is extended to multihop (N-hops), the operation of the source is as follows.

Figure 17:
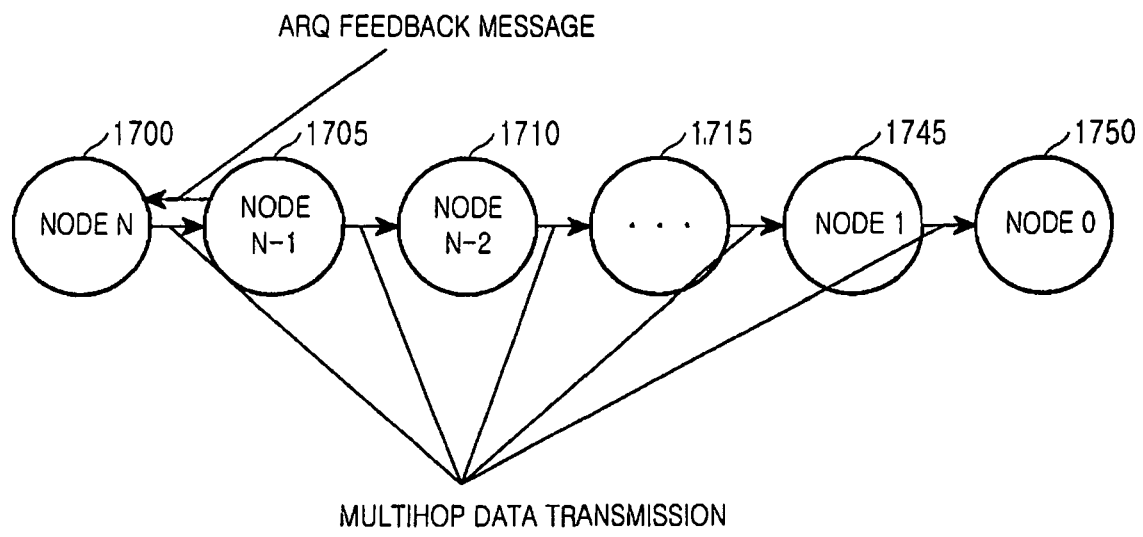
FIG. 17 illustrates a network configuration of a multihop system according to the present invention.

FIG. 17 illustrates a network configuration of a multihop system according to the present invention.

Referring to FIG. 17, a node N 1700 may be a node for relaying data of another upper node. A node N–1 1705 transmits an N-hop ARQ feedback message to the node N 1700, based on a lower (N–1)-hop ARQ feedback message transmitted from a node N–2 1710.

The method of configuring the ACK MAP using variable bit size has been described. This method is advantageous to 2-hop. The generalization of the method using the variable bit size will be described below.

Figure 18:
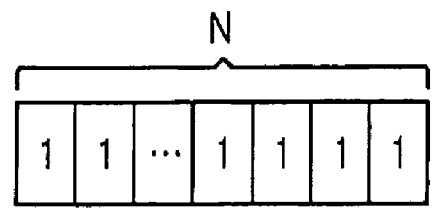
FIG. 18 illustrates an ACK MAP having a variable bit size according to the present invention.
Figure 18:
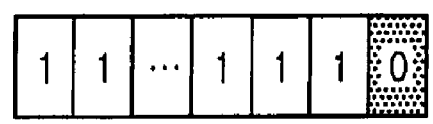
Figure 18:
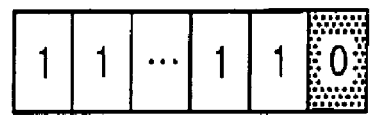
Figure 18:
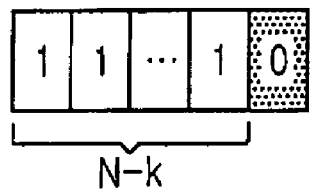
Figure 18:

FIG. 18 illustrates an ACK MAP having variable bit size according to the present invention.

Referring to FIG. 18, when data is transmitted in a multihop system with N hops, the ACK MAP of the ARQ feedback is set to "1" when data is successfully transmitted. When data fails to be transmitted, only one "0" is inserted to the last location of the ACK MAP.

That is, when N hops are successfully transmitted, N number of "1" are set to the N hops (step a)).

When (N–1) hops, (N–2) hops, and (N–k) hops are successfully transmitted and their remaining hops fail to be transmitted, only one "0" is inserted to the TX-fail hops (steps b), c) and d)).

The reason why only one "0" is inserted is that data after the TX-fail hop cannot be received. Therefore, variable bit size is required in order to indicate the success/fail of each block.

In order to indicate the success/fail of each block, the ACK MAP of the ARQ feedback is configured by arranging bits according to the order of BSN.

A method of configuring the ACK MAP using a fixed bit size in each block will be described below. This method is advantageous as the number of hops increases.

When k-hop data transmission succeeds in an N-hop system, the success/fail of each block is indicated by binary number representing decimal number k using a number of bits equal to a maximum natural number less than or equal to $\log_2(N+1)$. The ACK MAP is generated by arranging the bits according to BSNs of the respective blocks and is inserted into the ARQ feedback message. The ARQ feedback message is transmitted to an upper node spaced apart by 1 hop, which transmits the data.

When N=3 (i.e., 3-hop), a 2-bit fixed bit ($\log_2 4=2$) is required. Table 7 below shows the classification of hops with respect to 2 bits.

TABLE 7

| Classification | Description | Bit expression |
|---|---|---|
| A | Data TX success until 0-hop | 00 (or 11) |
| B | Data TX success until 1-hop | 01 (or 10) |
| C | Data TX success until 2-hop | 10 (or 01) |
| D | Data TX success until 3-hop | 11 (or 00) |

The case in which the data TX succeeds until a specific hop can be expressed using the binary number expression of the specific hop, or the binary number expression of "(total number of hops)−(number of TX-success hops)"

A method for generating the ACK MAP of the ARQ feedback message in the multihop system having a plurality of MH-BTSs will be described below.

Figure 19:
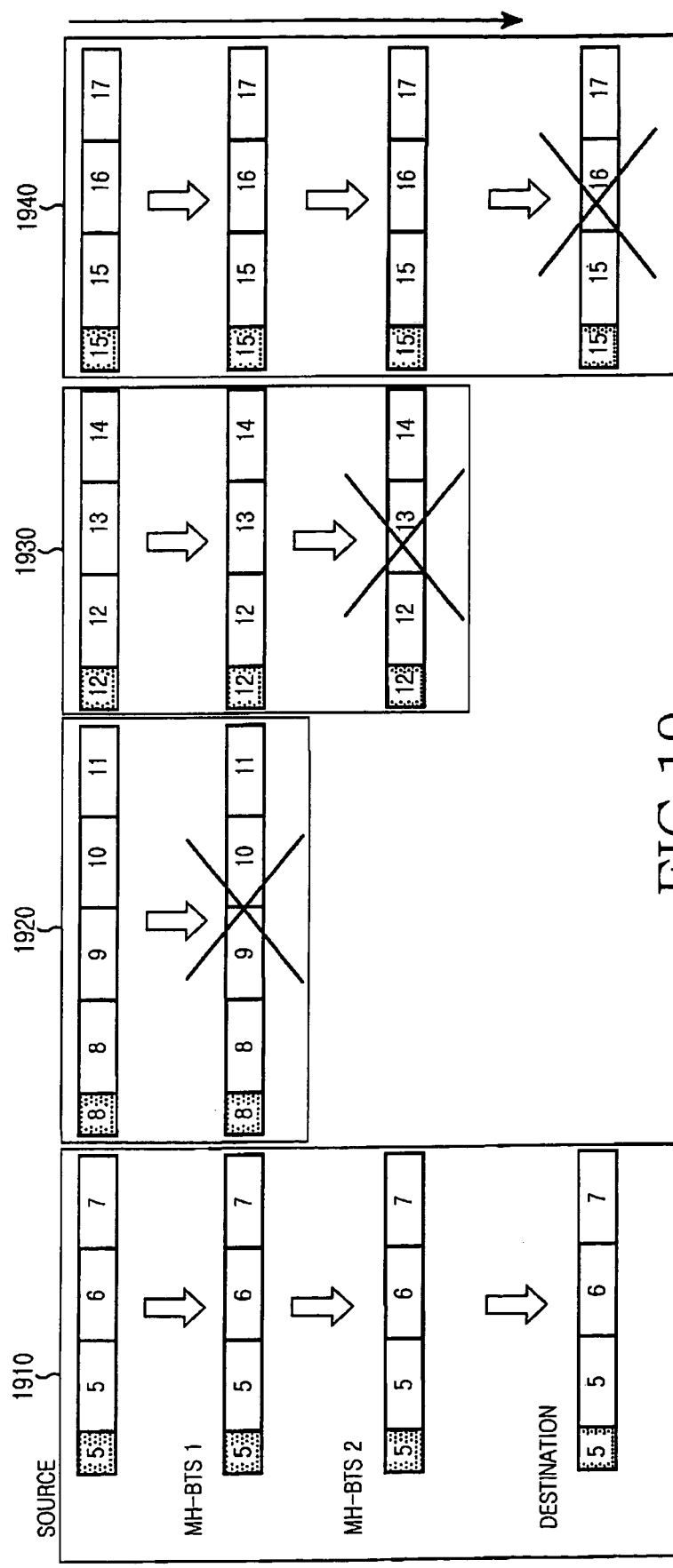
FIG. 19 illustrates an ACK MAP transmission in a 3-hop system according to the present invention.

FIG. 19 illustrates an example of ACK MAP transmission in a 3-hop system according to the present invention.

Referring to FIG. 19, two MH-BTSs exist between a source and a destination.

A reference numeral 1910 indicates a case in which data is successfully transmitted from the source to the destination. A reference numeral 1920 indicates a case in which data fails to be transmitted even to the first MH-BTS.

A reference numeral 1930 indicates a case in which data is successfully transmitted from the source to the first MH-BTS but fails to be transmitted from the first MH-BTS to the second MH-BTS.

A reference numeral 1940 indicates a case in which data is successfully transmitted from the source to the first MH-BTS and from the first MH-BTS to the second MH-BTS, but fails to be transmitted from the second MH-BTS to the destination.

Figure 20:
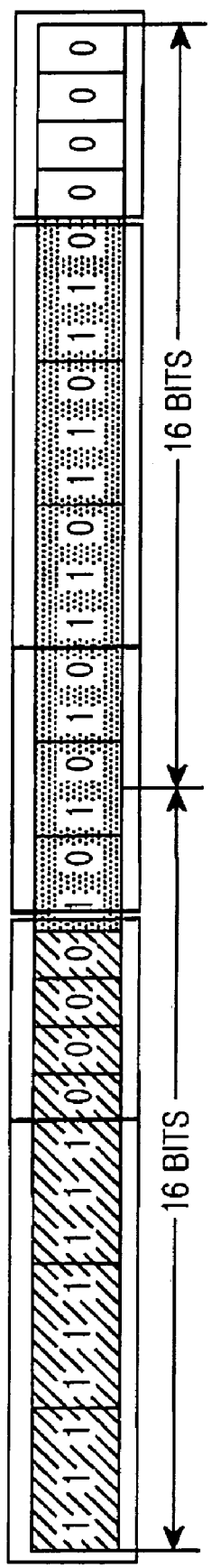
FIG. 20 illustrates a selective ACK MAP having a variable bit size in a 3-hop system according to the present invention.

FIG. 20 illustrates a selective ACK MAP having a variable bit size in a 3-hop system according to the present invention. Specifically, FIG. 20 illustrates a selective ACK MAP of an ARQ feedback message transmitted from the first MH-BTS to the source in the situation of FIG. 19. In the selective ACK MAP, "1" indicates the hops that are successfully transmitted.

The selective ACK MAP of FIG. 20 will be examined in a direction from MSB toward LSB. Each of the blocks 5, 6 and 7 (the case 1910) is set to "111" because they are successfully transmitted up to the 3-hop. Also, each of the blocks 8, 9, 10 and 11 (the case 1920) is set to "0" because they fail to be transmitted.

Each of the blocks 12, 13 and 14 (the case 1930) is set to "10" because they are successfully transmitted to 1-hop. Each of the blocks 15, 16 and 17 (the case 1940) is set to "110" because they are successfully transmitted up to 2-hop.

Figure 21:
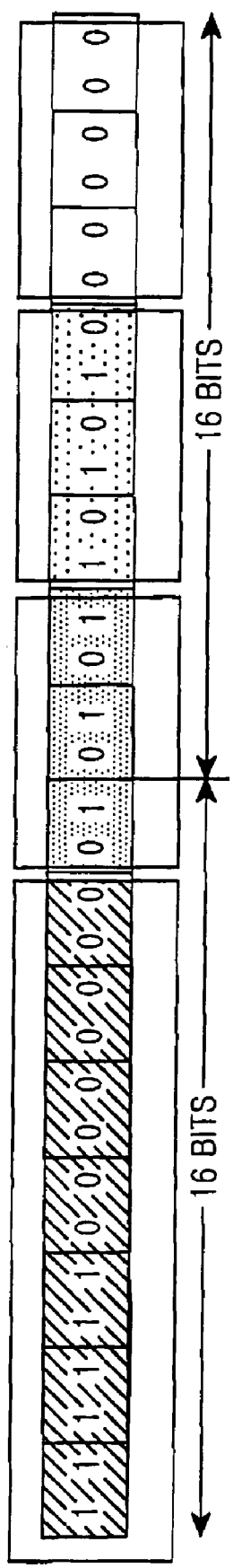
FIG. 21 illustrates a selective ACK MAP having a fixed bit number in a 3-hop system according to the present invention.

FIG. 21 illustrates a selective ACK MAP having a fixed bit size in a 3-hop system according to the present invention. Because a total number of hops are 3 in the situation of FIG. 19, 2 bits ($\log_2 4=2$) is required.

The selective ACK MAP of FIG. 21 will be examined in a direction from MSB toward LSB. Each of the blocks 5, 6 and 7 (the case 1910) is set to a binary number "11" indicating "3", because they are successfully transmitted up to 3-hop. Each of the blocks 8, 9, 10 and 11 (the case 1920) is set to a binary number "00" indicating "0", because they are successfully transmitted up to 0-hop.

Each of the blocks 12, 13 and 14 (the case 1930) is set to a binary number "01" indicating "1", because they are successfully transmitted up to 1-hop. Each of the blocks 15, 16 and 17 (the case 1940) is set to a binary number "10" indicating "2", because they are successfully transmitted up to 2-hop.

In the case of the forward link, the MS 530 and the BTS 510 are the destination and the source, respectively. When there are a plurality of MH-BTSs, the MH-BTS firstly connected to the BTS 510 is the first MH-BTS, and the MH-BTS firstly connected to the MS 530 is the last MH-BTS. The MH-BTS closer to the BTS 510 is the upper MH-BTS.

In the case of the reverse link, the MS 530 and the BTS 510 are the source and the destination, respectively. The MH-BTS firstly connected to the MS 530 is the first MH-BTS, and the MH-BTS firstly connected to the BTS 510 is the last MH-BTS. The MH-BTS closer to the MS 530 is the upper MH-BTS.

As described above, when the ARQ technology is applied to the multihop system in the broadband wireless access communication network, the MS can transparently manage the ARQ state between the MS and the BTS without regard to the MH-BTS. Thus, the complexity of the MH-BTS can be reduced.

In addition, when the MH-BTS successfully receives data from the BTS but the MS fails to receive the data, it is possible to prevent the BTS from retransmitting the same data to the MH-BTS.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An automatic request (ARQ) apparatus of a source in a wireless access communication network, comprising:
a relay acknowledgement (ACK) analyzer for analyzing whether a relay successfully receives specific data or fails to receive the specific data, wherein the relay ACK analyzer assigns a bit size corresponding to a total number of hops to each block sequence number (BSN) according to data reception success/fail indicated by the BSN, thereby outputting if the relay successfully receives the specific data through information indicating the data reception success/fail in each hop, the information contained in ARQ feedback information element;
a destination ACK analyzer for analyzing whether a destination successfully receives the specific data or fails to receive the specific data; and
a transmit data adjuster for performing retransmission to the relay if the relay fails to receive the specific data from the source to the relay.

2. The automatic request apparatus of claim 1, wherein if the relay successfully receives the specific data and the destination fails to receive the specific data, the transmit data adjuster waits for an ACK for the specific data from the destination for a preset time.

3. The automatic request apparatus of claim 1, wherein if the relay successfully receives the specific data but the destination fails to receive the specific data, the transmit data adjuster discards the specific data if the transmit data adjuster does not receive an ACK for the specific data from the destination for a preset time.

4. The automatic request apparatus of claim 1, wherein if a specific relay among a plurality of relays fails to receive the specific data, a bit size corresponding to number of hops until the relay successfully receiving the data is assigned to the information contained in the ARQ feedback information element.

5. The automatic request apparatus of claim 1, wherein the relay ACK analyzer assigns log 2(N+1) bits, where N is a total number of hops, to each BSN according to data reception success/fail indicated by the BSN, thereby outputting if the relay successfully receives the specific data through information indicating data reception success until a specific hop.

6. An automatic request (ARQ) apparatus of a relay in a wireless access communication network, comprising:
a feedback ACK analyzer for analyzing feedback data from a destination whether the destination successfully receives specific data;
a transmit data adjuster for retransmitting the specific data according to an analysis from the feedback ACK analyzer;
a relay feedback data generator for generating feedback data indicating if the relay successfully receives the specific data transmitted from the source; and
a feedback ACK processor for combining the analysis data from the feedback ACK analyzer and the feedback data from the transmit data adjuster and outputting feedback data to be transmitted to the source wherein the feedback ACK processor assigns a bit size corresponding to a total number of hops to each block sequence number (BSN) according to data reception success/fail indicated by the BSN, thereby outputting if the relay successfully receives the specific data through information indicating the data reception success/fail in each hop, the information contained in ARQ feedback information element.

7. The automatic request apparatus of claim 6, wherein if the relay successfully receives the specific data and the destination fails to receive the specific data, the transmit data adjuster retransmits the specific data.

8. The automatic request apparatus of claim 6, wherein if a specific relay among a plurality of relays fails to receive the specific data, a bit size corresponding to number of hops until the relay successfully receiving the data is assigned to the information contained in the ARQ feedback information element.

9. The automatic request apparatus of claim 6, wherein the relay ACK analyzer assigns log 2(N+1) bits, where N is a total number of hops, to each BSN according to data reception success/fail indicated by the BSN, thereby outputting if the relay successfully receives the specific data through information indicating data reception success until a specific hop.

10. An automatic request method of a relay in a wireless access communication network, comprising the steps of:
transmitting, by a relay, a specific data from a source to a destination;
receiving, by the relay, first feedback data from the destination in response to the specific data;
determining, by the relay, if the destination successfully receives the specific data using the feedback data;
retransmitting, by the relay, the specific data to the destination if the destination fails to receive the specific data; and
transmitting, by the relay, second feedback data from the relay to the source including data indicating if the relay and the destination successfully receive the specific data, wherein the second feedback data includes assigning at least one bit which size is allocated corresponding to a total number of hops to each block sequence number (BSN) and which indicates success/fail for reception of data indicated by the BSN in each hop.

11. The automatic request method of claim 10, wherein assigning the at least one bit includes allocating a size of the bits as number of hops until the relay successfully receiving the data.

12. The automatic request method of claim 10, wherein the step of generating the second feedback data includes assigning log 2(N+1) bits, where N is a total number of hops, which indicate data reception success/fail indicated by the BSN until a specific hop.

13. An automatic request method of a source in a wireless access communication network, comprising the steps of:
transmitting first data to a relay;
receiving feedback data from the relay after the transmission of the first data, wherein the feedback data includes a field which bit size is assigned corresponding to a total number of hops to each block sequence number (BSN) and which indicates success/fail for reception of data indicated by the BSN in each hop;
determining if the relay successfully receives the first data, using the received feedback data;
determining if a destination successfully receives the first data, using the received feedback data;
retransmitting the first data if the relay fails to receive the first data; and
holding off retransmitting the first data if the relay succeeds to receive the first data and if the destination fails to receive the first data.

14. The automatic request method of claim 13, wherein the bit size of the field included in the feedback data is assigned as number of hops until the relay successfully receiving the data except if a specific relay among a plurality of relays fails to receive the specific data.

15. The automatic request method of claim 13, wherein the feedback data includes a field which is assigned to log 2(N+1) bits, where N is a total number of hops, indicating data reception success/fail indicated by the BSN until a specific hop.

16. An automatic request system in a wireless access communication network, comprising:
a source for determining if a relay successfully receives specific data by analyzing first feedback data received from the relay, and performing the retransmission if the relay fails to receive the specific data;
the relay for transmitting the specific data received from the source, determining if the destination successfully receives the specific data by analyzing second feedback data received from the destination, and retransmitting the specific data to the destination if the destination fails to receive the first data, wherein the relay and the source assign a bit size corresponding to a total number of hops to each block sequence number (BSN) according to data reception success/fail indicated by the BSN, thereby outputting if the relay successfully receives the specific data through information indicating the data reception success/fail in each hop, the information being contained in ARQ feedback information element; and
the destination for receiving the specific data from the relay and transmitting the second feedback data to the relay.

17. The automatic request system of claim 16, wherein when a specific relay among a plurality of relays fails to receive the specific data, a bit size corresponding to number of hops until the relay successfully receiving the data is assigned to the information contained in the ARQ feedback information element.

18. The automatic request system of claim 16, wherein the relay and the source assign log 2(N+1) bits, where N is a total number of hops, to each BSN according to data reception success/fail indicated by the BSN, thereby outputting if the relay successfully receives the specific data through information indicating data reception success until a specific hop.

* * * * *